US012803887B2

(12) United States Patent
Bondareva et al.

(10) Patent No.: US 12,803,887 B2
(45) Date of Patent: Nov. 17, 2026

(54) DEVICE, SYSTEM AND METHOD FOR ENABLING DATA EXCHANGES

(71) Applicant: MOTOROLA SOLUTIONS, INC., Chicago, IL (US)

(72) Inventors: Mariya Bondareva, Loxahatchee, FL (US); Brian W. Pruss, Streamwood, IL (US); Matthieu Corniquet, Virginia Beach, VA (US); Kevin Kinsey, Salt Lake City, UT (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 302 days.

(21) Appl. No.: 18/882,325

(22) Filed: Sep. 11, 2024

(65) Prior Publication Data

US 2026/0074966 A1 Mar. 12, 2026

(51) Int. Cl.
*H04L 41/22* (2022.01)
*G06F 3/0482* (2013.01)
(Continued)

(52) U.S. Cl.
CPC ............ *H04L 41/22* (2013.01); *G06F 3/0482* (2013.01); *G06F 3/04847* (2013.01);
(Continued)

(58) Field of Classification Search
CPC ....... H04L 41/22; H04L 41/145; G06Q 50/26; G06Q 50/265
See application file for complete search history.

(56) References Cited

U.S. PATENT DOCUMENTS 10,638,298 B1 * 4/2020 Di Domenico ........ G06N 20/00
12,442,641 B1 * 10/2025 Bell ..................... G01C 21/206
(Continued)

FOREIGN PATENT DOCUMENTS

WO 2021246881 A1 12/2021

OTHER PUBLICATIONS

Straub, Frank, et al., "Managing the Response to a Mobile Mass Shooting: A Critical Incident Review of the Kalamazoo, Michigan, Public Safety Response to the Feb. 20, 2016, Mass Shooting Incident", Apr. 2017, Police Foundation.
(Continued)

*Primary Examiner* — Daniel Samwel
(74) *Attorney, Agent, or Firm* — PERRY + CURRIER INC. (FOR MSI)

(57) ABSTRACT

A device obtains: a first dataset identifying one or more data-sharing parameters between agencies that indicate communication permissions therebetween; and a second dataset identifying data exchanged between two agencies as part of a response to a simulated incident. The device maps the data identified by the second dataset to the one or more data-sharing parameters. Based on the mapping the device, determines that a data-sharing parameter fails to permit data-sharing for the data exchanged in the simulated incident and, in response, automatically generates a graphic user interface (GUI) identifying the data exchanged, and including actuatable inputs associated with data-sharing parameters that fails to permit data-sharing. In response to receiving an actuation of an actuatable input, the device modifies an associated data-sharing parameter to permit data-sharing between an agency and one or more other agencies, via one or more communication resources, for given data that corresponds to the data exchanged.

16 Claims, 18 Drawing Sheets

(51) Int. Cl.
*G06F 3/04847* (2022.01)
*G06Q 50/26* (2024.01)
*H04L 41/14* (2022.01)

(52) U.S. Cl.
CPC ........... *H04L 41/145* (2013.01); *G06Q 50/26* (2013.01); *G06Q 50/265* (2013.01)

(56) References Cited

U.S. PATENT DOCUMENTS

| | | | | |
|---|---|---|---|---|
| 2013/0222133 | A1* | 8/2013 | Schultz | H04W 4/21 340/539.11 |
| 2022/0335154 | A1 | 10/2022 | Schuler et al. | |
| 2022/0337902 | A1 | 10/2022 | Tian | |
| 2023/0087197 | A1 | 3/2023 | Piett et al. | |
| 2023/0092091 | A1* | 3/2023 | Gustof | G06F 9/5083 718/104 |
| 2023/0281526 | A1* | 9/2023 | Pereira | G06Q 50/265 705/7.15 |
| 2025/0310333 | A1* | 10/2025 | Deckys | H04L 63/10 |

OTHER PUBLICATIONS

"Multiple Sheriffs Provide Details on Multi-Jurisdictional Deputy-Involved Shooting in Tampa" YouTube Video streamed live on Aug. 12, 2023.

* cited by examiner

DEVICE, SYSTEM AND METHOD FOR ENABLING DATA EXCHANGES

BACKGROUND OF THE INVENTION

During multijurisdictional incidents, public safety agencies often struggle with communication inefficiencies and/or an inability to communicate with each other. These include the inability to transmit certain types of information, such as images or videos, across different systems, leading to delays and uncoordinated responses. Furthermore, dispatch centers, and the like, may lack the capability to receive critical data via a particular communication resource.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
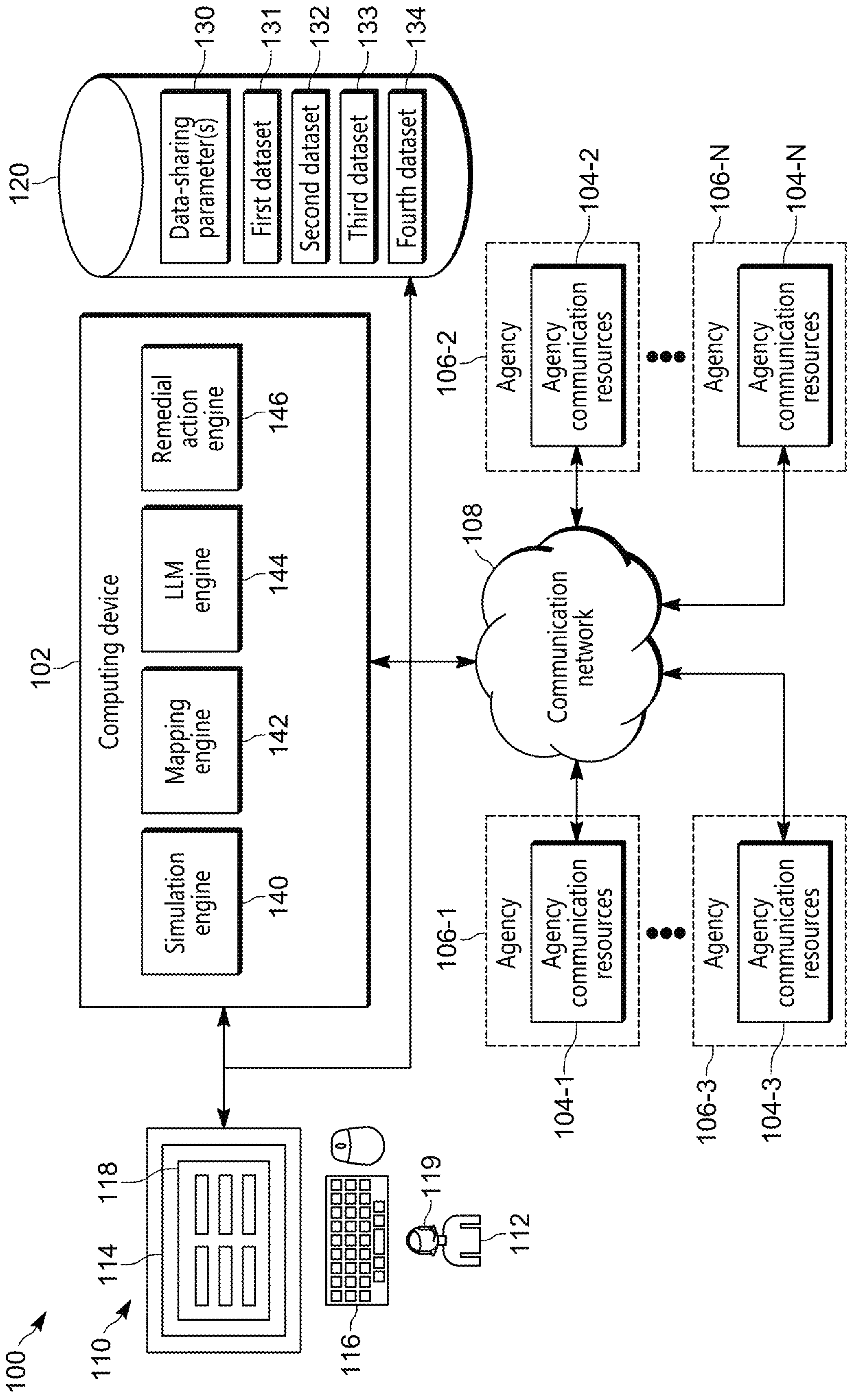
FIG. 1 is a system for enabling data exchanges, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

During multijurisdictional incidents, communication between public safety agencies is key to responding to such incidents. For example, a multijurisdictional incident may include any type of incident where two or more public safety agencies are involved with responding to the incident. Hence, when communication resources of such agencies are not sufficiently configured to communicate with each other, which may include, but is not limited to, communication permissions for such communication devices not allowing such communications, other types of communication resources may have to be found to effect such communications on an ad hoc basis. For example, a dispatch center of one agency may lack the capability to receive critical data from another agency via a particular type of communication resource due to communications from such a particular type of communication resource being electronically blocked and/or due the dispatch center not being effectively equipped. Thus, there exists a need for an improved technical method, device, and system for enabling data exchanges between agencies.

In particular, provided herein is a device, system and method for enabling data exchanges, for example between communication devices of agencies.

An aspect of the present specification provides a method comprising: obtaining, via a computing device, a first dataset identifying one or more data-sharing parameters between an agency and one or more other agencies, the one or more data-sharing parameters indicating communication permissions for communicating given data between the agency and the one or more other agencies via one or more communication resources; obtaining, via the computing device, a second dataset comprising information corresponding to a simulated incident involving a first agency and a second agency, the second dataset identifying data exchanged between the first agency and the second agency via one or more respective communication resources as part of a response to the simulated incident; mapping, via the computing device, the data exchanged between the first agency and the second agency, identified by the second dataset, to the one or more data-sharing parameters identified by the first dataset; based on the mapping of the data exchanged to the one or more data-sharing parameters, determining, via the computing device, that at least one of the one or more data-sharing parameters fails to permit data-sharing for at least a portion of the data exchanged in the simulated incident via the one or more communication resources between the agency and the one or more other agencies; in response to determining the at least one of the one or more data-sharing parameters fails to permit data-sharing: automatically generating, via the computing device, a graphic user interface (GUI) identifying the portion of the data exchanged, the GUI including one or more actuatable inputs associated the at least one of the one or more data-sharing parameters that fails to permit data-sharing; and receiving, via the computing device, an actuation of an actuatable input, of the one or more actuatable inputs and, in response: modifying an associated data-sharing parameter to permit data-sharing between the agency and the one or more other agencies, via the one or more communication resources, for given data that corresponds to the portion of the data exchanged.

Another aspect of the present specification provides a computing device comprising: a controller; and a computer-readable storage medium having stored thereon program instructions that, when executed by the controller, causes the controller to perform a set of operations comprising: obtaining a first dataset identifying one or more data-sharing parameters between an agency and one or more other agencies, the one or more data-sharing parameters indicating communication permissions for communicating given data between the agency and the one or more other agencies via one or more communication resources; obtaining a second dataset comprising information corresponding to a simulated incident involving a first agency and a second agency, the second dataset identifying data exchanged between the first agency and the second agency via one or more respective communication resources as part of a response to the simulated incident; mapping the data exchanged between the first agency and the second agency, identified by the second dataset, to the one or more data-sharing parameters identified by the first dataset; based on the mapping of the data exchanged to the one or more data-sharing parameters, determining that at least one of the one or more data-sharing parameters fails to permit data-sharing for at least a portion of the data exchanged in the simulated incident via the one or more communication resources between the agency and the one or more other agencies; in response to determining the at least one of the one or more data-sharing parameters fails to permit data-sharing: automatically generating a graphic user interface (GUI) identifying the portion of the data exchanged, the GUI including one or more actuatable inputs associated the at least one of the one or more data-sharing parameters that fails to permit data-sharing; and receiving an actuation of an actuatable input, of the one or more actuatable inputs and, in response: modifying an associated data-sharing parameter to permit data-sharing between the agency and the one or more other agencies, via the one or more communication resources, for given data that corresponds to the portion of the data exchanged.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Herein, reference will be made to engines, which may be understood to refer to hardware, and/or a combination of hardware and software (e.g., a combination of hardware and software includes software hosted at hardware such that the software, when executed by the hardware, transforms the hardware into a special purpose hardware, such as a software module that is stored at a processor-readable memory implemented or interpreted by a processor), or hardware and software hosted at hardware and/or implemented as a system-on-chip architecture and the like.

Further advantages and features consistent with this disclosure will be set forth in the following detailed description, with reference to the drawings.

Attention is directed to FIG. 1, which depicts an example system 100 for enabling data exchanges. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

The system 100 comprises a computing device 102, and "N" number of respective agency communication resources 104-1, 104-2, 104-3 . . . 104-N associated with respective agencies 106-1, 106-2, 106-3 . . . 106-N.

The respective agency communication resources 104-1, 104-2 . . . 104-N are interchangeably referred to hereafter, collectively, as the communication resources 104 and, generically, as a set of communication resources 104. This convention will be used elsewhere in the present specification. For example, the agencies 106-1, 106-2, 106-3 . . . 106-N are interchangeably referred to hereafter, collectively, as agencies 106 and, generically, as an agency 106. The agencies 106 are drawn in dashed lines that encompass respective agency communication resources 104 to indicate that the association between the agencies 106 and the respective agency communication resources 104, and to furthermore indicate that the agencies 106 may be entities. Indeed, while the respective agency communication resources 104 are associated with respective agencies 106, the agencies 106 may be associated with other computing resources, not depicted, with which the respective agency communication resources 104 may be used to communicate, including, but not limited to, public safety operating point computing resources, dispatch computing resources, computing devices for implementing certain functionality relating the agencies 106 (e.g., such as accessing records and/or video, and the like, such as employee records, criminal records, vehicle records, hospital records, patient records, video from closed circuit cameras, for example at a hospital, and/or records and/or video that may include personally identifiable information (PII), and the like, amongst other possibilities).

The number "N" of the agencies 106 may be any suitable number, and may be as low as two agencies 106, and associated sets of communication resources 104, but may be between two and ten agencies 106, or higher (e.g., with "N" in the tens, hundreds, etc.), and/or "N" may be two or more agencies 106.

Furthermore, the respective agency communication resources 104 may be configured to communicate with at least one communication network 108, which may comprise a combination of one or more wireless communication networks, and/or one or more wired communication networks. For simplicity, the at least one communication network 108 is interchangeably referred to hereafter as the communication network 108.

As depicted, the computing device 102 may also be configured to communicate with the communication network 108, and is further configured to communicate with a terminal 110.

The terminal 110 may comprise a terminal associated with one or more of the agencies 106, and/or the terminal 110 may comprise a public safety operating point (PSAP) terminal, and/or the terminal 110 may comprise a dispatch terminal, and the like. As depicted, the terminal 110 may be operated by an operator 112, and the terminal 110 may comprise a display screen 114 and an input device 116 (e.g., as such a keyboard and pointing device (e.g., a mouse), as depicted, and/or any other suitable input device and/or combination thereof). However, terminal 110, the display screen 114 and the input device 116 may be provided in any suitable format, such as a laptop, a personal computer, and the like (e.g., when the operator 112 is working from home and/or "off-premises" from a PSAP, and the like). In general, the display screen 114 and the input device 116 may be used to interact with the terminal 110, for example via a graphic user interface (GUI) 118 provided at the display screen 114, and the like and, as described herein, the GUI 118 may include a special purpose GUI for assisting with enabling data exchanges. As depicted, the terminal 110 may further comprise a communication device, for example as represented in FIG. 1 by a headset 119 worn by the operator 112, such that the operator 112 may communicate with, for example, the communication resources 104 of one or more of the agencies 106.

While the terminal 110 is depicted as being communicatively coupled with the computing device 102, the terminal 110 may be further configured to communicate with the communication network 108, and indeed, communicative coupling between the terminal 110 and the computing device 102 may be via the communication network 108. Furthermore, the terminal 110 may be a communication resource 104 associated with an agency 106.

The agencies 106 may comprise public-safety agencies and/or first responder agencies, and the like, that may include, but is not limited to, police agencies, firefighter agencies, emergency medical agencies, hospital agencies, and the like, though the agencies 106 may include private first responder agencies, such as private security agencies, private medical agencies (e.g., private hospitals), and the like. Furthermore, two or more of the agencies 106 may be associated with different jurisdictions, such as different cities, different counties, different states and the like. However, in some instances, the agencies 106 may need to cooperate, for example to respond to, and/or coordinate on, incidents, and/or multijurisdictional incidents. Such incidents may be as complex as various police agencies and/or firefighter agencies and/or emergency medical agencies and/or hospital agencies responding to a public-safety incident that may cross jurisdictional lines. However, such incidents may be as simple as a dispatcher from one agency 106 taking a call from a communication device of a police officer (or a private citizen) and needing to receive video and/or photos from the communication device in relation to an incident, which may or may not be multijurisdictional. As such, incidents as described herein need not be explicitly multijurisdictional. For example, one agency 106 may comprise a fire department of a given jurisdiction (e.g., a given city), and another agency 106 may comprise a police department of the same given jurisdiction (e.g., the same given city).

Regardless, it is understood that the respective communication resources 104 of the agencies 106 may need to communicate with each other in relation to an incident, and the like.

While not depicted, the respective communication resources 104 of the agencies 106 may comprise radios, vehicle radios, cell phones, mobile devices, terminals (e.g., such as the terminal 110), and like, that the various agencies 106 use to communicate, both within an agency 106 and external to an agency 106, for example via the communication network 108.

However, various technical impediments may exist in the system 100 that may interfere with such communication. For example, an agency 106 may place software and/or restrictions on their communication resources 104 that restrict certain communications, such as restrictions in communicating with communication resources 104 outside the agency 106. Such restrictions may furthermore be specific between two agencies 106. For example, the agency 102-1 may be restricted from certain types of communications with the agency 102-2, and/or vice versa, and/or certain communication resources 104-1 of the agency 102-1 may be restricted from certain communication resources 104-2 of the agency 102-2, and vice versa. Furthermore some restrictions may be unidirectional, such that communication resources 104-1 of the agency 102-1 may be restricted from sending communications to communication resources 104-2 of the agency 102-2, but communication resources 104-2 of the agency 102-2 may not be restricted from sending communications to communication resources 104-1 of the agency 102-1. Other restrictions may be bidirectional, such that respective communication resources 104-1, 104-2 of both agencies 102-1, 102-2 may be restricted from sending communications therebetween. Such unidirectionality and bidirectionality may furthermore apply to certain respective communication resources 104-1, 104-2 (e.g., a subset thereof) of the agencies 102-1, 102-2.

In some examples, types of communications that may be restricted may include, but are not limited to, communications that include PII, and the like. More particularly, types of communications that may be restricted may include certain types of information, such as PII.

Alternatively, or in addition, certain types of communications may be restricted, such as receipt of video at terminals of a dispatch center, and the like. Again, such restrictions may be unidirectional or bidirectional.

Alternatively, or in addition, an agency 106 may lack certain types of communication resources 104 for certain types of communications; for example, the aforementioned terminals may not be restricted from receiving video, but the aforementioned terminals may not be able to receive video (e.g., such terminals may lack the technical functionality for receiving video).

Hence, such technical impediments may interfere with communications between the agencies 106, for example during incidents and/or multijurisdictional incidents, and/or such technical impediments may prevent communications between the agencies 106, and/or such technical impediments may prevent certain types of communications at the agencies 106.

As further depicted in FIG. 1, the computing device 102 is communicatively coupled with a memory 120, which, as depicted, may be provided in the form of a database, that stores data-sharing parameters 130, a first dataset 131, a second dataset 132, a third dataset 133 and a fourth dataset 134 that are next described.

In particular, the data-sharing parameters 130 generally indicate communication permissions for communicating given data between the agencies 106 via one or more communication resources 104. For example, a subset of data-sharing parameters 130 may specifically indicate communication permissions for communicating given data between two respective agencies 106 via one or more respective sets of communication resources 104.

For example, one data-sharing parameter 130 may indicate that communication resources 104 operated by police officers of one agency 106 are permitted to share police data with communication resources 104 of a further specific agency 106. Conversely, another data-sharing parameter 130 may indicate that communication resources 104 operated by police officers of one agency 106 are not permitted to share police data with communication resources 104 of a further specific agency 106. Alternatively, or in addition, when there is no data-sharing parameter 130 indicating that communication resources 104 operated by police officers of one agency 106 are permitted to share police data with communication resources 104 of a further specific agency 106, then it is implicit in the system 100 that communication resources 104 operated by police officers of one agency 106 are not permitted to share police data with communication resources 104 of the further specific agency 106.

In another example, one data-sharing parameter 130 may indicate that communication resources 104 of one agency 106 are not permitted to share certain information, and/or types of information, such as patient records and/or video from a hospital (e.g., assuming the agency 106 comprises a hospital), with communication resources 104 of certain other agencies 106. Conversely, another data-sharing parameter 130 may indicate that communication resources 104 of one agency 106 are permitted to share certain information, and/or types of information, such as patient records and/or video from a hospital (e.g., assuming the agency 106 comprises a hospital), with communication resources 104 of certain other agencies 106. While patient records and/or video from a hospital is one example of an information type that may be restricted, any suitable PII is within the scope of the present specification.

In particular, the first dataset 131 may identify one or more data-sharing parameters 130 between a given agency 106 and one or more other agencies 106. Put another way, the first dataset 131 may identify a subset of the data-sharing parameters 130 that indicate communication permissions for communicating given data between two respective agencies 106 via one or more respective sets of communication resources 104.

The second dataset 132 comprises information corresponding to a simulated incident involving a first agency 106 and a second agency 106, the second dataset 132 identifying data exchanged between the first agency 106 and the second agency 106 via one or more respective communication resources 104 as part of a response to the simulated incident. The first agency 106 and the second agency 106 may be any two of the agencies 106, or the first agency 106 and the second agency 106 may be any agencies that may be external to the system 100 (e.g., and may not be one of the agencies 106).

Furthermore, the information corresponding to a simulated incident may generally be based on data from one or more real-life incidents that was used to simulate the simulated incident. Such data may be stored at the memory 120 as a fourth dataset 134. For example, the fourth dataset 134 may indicate communications that occurred and/or were attempted between two or more agencies (e.g., that may or may not include two of the agencies 106) in one or more real-life incidents that may be multijurisdictional.

The third dataset 133 comprises information identifying available respective communication resources 104 of an agency 106, and generally further identifies one or more respective communication resources 104 of one or more of the first agency 106 and the second agency 106 used for the data exchanged in the aforementioned simulated incident. Hence, the third dataset 133 may include indicators of available respective communication resources 104 of an agency 106, as well as respective communication resources used by the agencies in the simulated incident.

As depicted, the computing device 102 generally comprises engines for performing certain functionality as described herein, though functionality of such engines may be provided in any suitable manner.

In particular, as depicted, the computing device 102 comprises a simulation engine 140, a mapping engine 142, a large language model (LLM) engine 144, and a remedial action engine 146. The simulation engine 140 may be used to simulate an incident, for example between two of the agencies, and may be further based on the third dataset 133 and the fourth dataset 134.

Hence, it is understood that the first dataset 131 and the third dataset 133 may be preconfigured at the memory 120, for example via the agencies 106 registering, at the memory 120, data pertaining to data-sharing parameters 130 that define permissions for communicating, as well as their respective communication resources 104. Such registration may occur via the computing device 102, or such registration may occur via another computing device (not depicted) that maintains the memory 120.

The fourth dataset 134 may also be preconfigured at the memory 120 and may be obtained from any suitable source associated with the aforementioned real-life incidents. Indeed, the fourth dataset 134 generally enables the computing device 102 to determine types of communications between agencies in real-life incidents and/or what types of communication resources may be used in real-life incidents.

The second dataset 132 may be generated by the computing device 102 via the simulation engine 140. However, in other examples, the second dataset 132 may be generated by one or more other computing devices (not depicted) implementing a simulation engine similar to the simulation engine 140. As such, the simulation engine 140 may be optional, and the second dataset 132 may be preconfigured at the memory 120 by the one or more other computing devices.

As depicted, the computing device 102 may further comprise a mapping engine 142 that may map the data exchanged between the first agency 106 and the second agency 106 during the simulated incident (e.g., and identified by the second dataset 132), to the one or more data-sharing parameters 130 identified by the first dataset 131 for a given agency 106 and one or more other agencies 106.

Put another way, the second dataset 132 may identify data exchanges, and/or attempted data exchanges, between the first agency 106 and the second agency 106 that occurred in the simulated incident. Such data exchanges may be mapped to one or more data-sharing parameters 130 identified by the first dataset 131 for a given agency 106 and one or more other agencies 106, that may or may not be the same as the agencies 106 of the simulated incident.

For example, the second dataset 132 may indicate that the first agency 106 and the second agency 106 attempted to share video from a hospital in the simulated incident, and indeed such sharing of video from a hospital may have been attempted in the aforementioned real-life incident as indicated by the fourth dataset 134.

Alternatively, or in addition, the second dataset 132 may indicate that the first agency 106 and the second agency 106 attempted to communicate via respective radios and/or radio types, and indeed such communication via respective radios and/or radio types of different agencies may have been attempted in the aforementioned real-life incident as indicated by the fourth dataset 134. The second dataset 132 may indicate that a mobile device of the first agency 106 may have attempted to transmit a video to a terminal of the second agency 106, and indeed such transmission of a video to a terminal of an agency may have been attempted in the aforementioned real-life incident as indicated by the fourth dataset 134.

For a given agency 106, and one or more other agencies 106, the mapping engine 142 may map such data exchanges identified in the simulated incident to data-sharing parameters 130 between the given agency 106, and the one or more other agencies 106, to determine whether or not permissions exist between the given agency 106, and the one or more other agencies 106 for such data exchanged. Hence, the computing device 102 may make a determination of whether or not similar data exchanges between the given agency 106, and the one or more other agencies 106 would be successful for example in a future incident that involved the given agency 106, and the one or more other agencies 106, as based on the data-sharing parameters 130.

Based on the mapping of the data exchanged in the simulated incident, to the one or more data-sharing parameters 130 between the given agency 106, and the one or more other agencies 106, the computing device 102 may determine that at least one of the one or more data-sharing parameters 130 fails to permit data-sharing for at least a portion of the data exchanged in the simulated incident via one or more communication resources 104 between the given agency 106 and the one or more other agencies 106. Such a failure to permit data-sharing may lead to the agencies 106 being unable to coordinate for an incident and may further lead to other technical problems, such as using other communication resources for workarounds, wasting processing and communication resources in the system 100.

For example, when the second dataset 132 indicates that sharing of video from a hospital occurred in the simulated incident, and/or was attempted, but, according to their respective data-sharing parameters 130, communication resources 104 of the given agency 106, and the one or more other agencies 106 are not permitted to share video from a hospital, then the computing device 102 may determine that at least one of the one or more data-sharing parameters 130 fails to permit sharing of video from a hospital.

In response to determining the at least one of the one or more data-sharing parameters 130 fails to permit data-sharing, the computing device 102 may automatically generate the GUI 118 identifying the portion of the data exchanged in the simulated incident that may not be shareable between the communication resources 104 of the given agency 106 and the one or more other agencies 106 (e.g., such as video from a hospital). As will be described in more detail with respect to FIG. 5 to FIG. 18, the GUI 118 may include one or more actuatable inputs associated with at least one of the one or more data-sharing parameters 130 that fail to permit data-sharing.

The computing device 102 may receive (e.g., from the terminal 110) an actuation of an actuatable input, of the one or more actuatable inputs and, in response: modify an associated data-sharing parameter 130 to permit data-sharing between the given agency 106 and the one or more other agencies 106, via their one or more respective communication resources 104, for given data that corresponds to the portion of the data exchanged in the simulated incident and which was not previously shareable between the given agency 106 and the one or more other agencies 106. Such modification of the associated data-sharing parameter 130 to permit data-sharing may occur via the LLM engine 144, that may generate a replacement data-sharing parameter 130 that permits data sharing and/or alter the associated data-sharing parameter 130 to permit data sharing, and/or generate computer program code to that implements such functionality.

For example, the GUI 118 may indicate the given agency 106 and one or more of the other agencies 106 where sharing of video from a hospital failed, and the GUI 118 may include an electronic button that, when actuated, causes the computing device 102 to implement computer program code, for example generated by the LLM engine 144, for modifying an associated data-sharing parameter 130 to permit sharing of video from a hospital, for example under certain conditions. Such a modification of an associated data-sharing parameter 130 may cause communication resources 104 of the given agency 106 and/or one or more of the other agencies 106, to be updated to enable such sharing of video from a hospital, for example by modifying software of such communication resources 104 to remove restrictions on sharing of video from a hospital and/or modifying software of such communication resources 104 to remove restrictions under certain conditions, such as a person associated with the hospital (e.g., a patient or an employee, and the like) is a suspect in an incident and, when a search warrant, and the like, is provided to the communication resources 104, sharing of that video from the hospital by a hospital agency to a police agency is permitted.

As will be explained in more detail, the mapping engine 142 may be further configured to map respective communication resources 104 of one or more of the first agency 106 and the second agency 106 of the simulated incident, to the available communication resources 104 of the given agency 106 and/or one or more of the other agencies 106. For example, the third dataset 133 may indicate which communication resources 104 of one or more of the first agency 106 and the second agency 106 were used in the simulated incident, and the mapping engine 142 may identify similar communication resources 104 of the given agency 106 and/or one or more of the other agencies 106 to determine whether the given agency 106 and/or one or more of the other agencies 106 lacks an available communication resource 104 for data-sharing between the given agency 106 and the one or more other agencies 106 for at least a further portion of the data exchanged in the simulated incident.

Put another way, when the simulated incident indicates that a terminal of the first agency 106 or the second agency 106 was unable to receive video from another communication resource 104, the mapping engine 142 may identify whether a similar terminal is associated with the given agency 106 and/or one or more of the other agencies 106, and whether, or not, such a terminal can receive video.

In response to determining the given agency 106 and/or one or more of the other agencies 106 lacks an available communication resource 104 for data-sharing of the further portion of the data exchanged, the computing device 102 may automatically update the GUI 118, to identify the further portion of the data exchanged (e.g., video that is to be transmitted to a terminal); and to include one or more further actuatable inputs associated with the further portion of the data exchanged.

Similar to as described above, the computing device 102 may receive a further actuation of a further actuatable input, of the one or more further actuatable inputs and, in response, implement an electronic remedial action to provide a communication resource 104 for the given agency 106 to enable communications between the given agency 106 and the one or more other agencies 106, for further given data that corresponds to the further portion of the data exchanged.

For example, the GUI 118 may indicate the given agency 106 and one or more of the other agencies 106 where sharing of a video failed, and the GUI 118 may include an electronic button that, when actuated, causes the computing device 102 to implement computer program code for implementing an electronic remedial action to enable sharing of video in conjunction with a terminal.

Such an electronic remedial action may be implemented by the electronic remedial action engine 146 may include, but is not limited to, installing an application at a communication resource 104 that enables receipt of certain types of data that corresponds to the further portion of the data exchanged, provisioning a communication resource 104 that is capable of receiving of data that corresponds to the further portion of the data exchanged, and the like.

For example, again using sharing of a video as an example, the electronic remedial action engine 146 may cause an application for receiving video to be installed at terminals of the given agency 106 and/or one or more of the other agencies 106, and/or the electronic remedial action engine 146 may cause a communication resource that is capable of receiving video to be provisioned to operators of terminals of the given agency 106, and/or to an officer of the given agency 106.

In this manner, for future incidents, data exchanges that were not previously possible between the agencies 106 may be enabled to prevent communication failures for future incidents.

Figure 2:
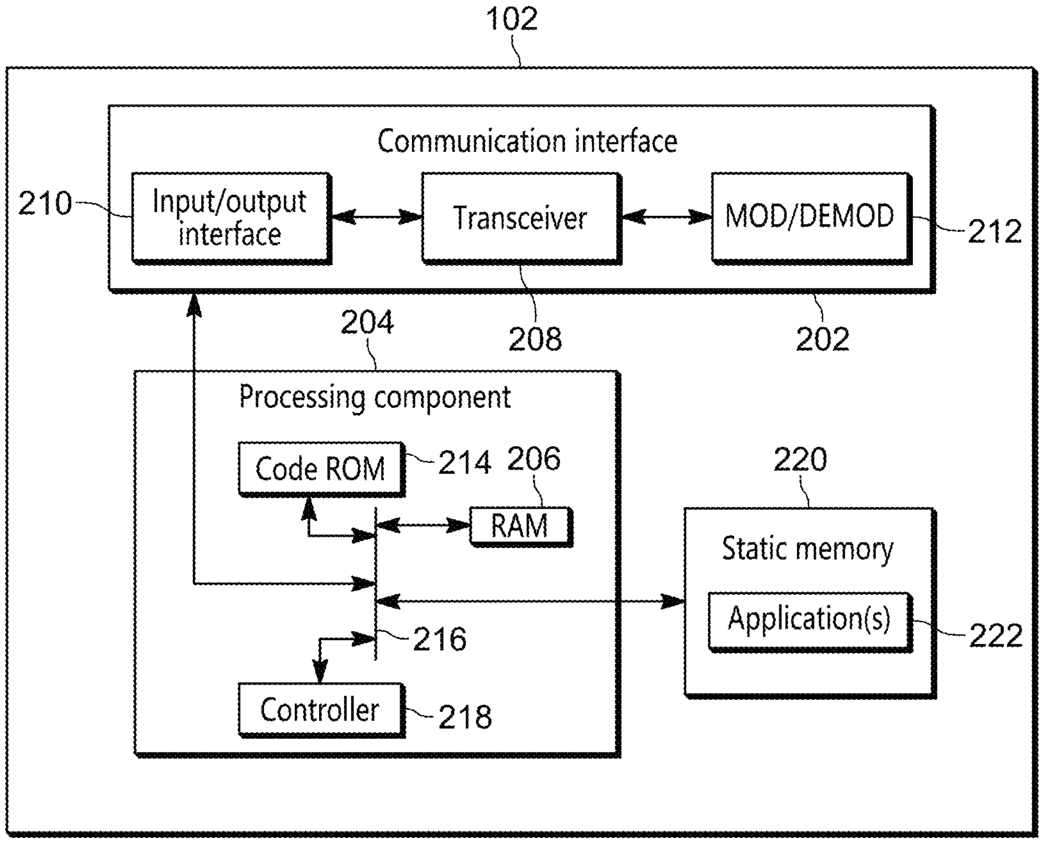
FIG. 2 is a device diagram showing a device structure of a computing device for enabling data exchanges, in accordance with some examples.

Attention is next directed to FIG. 2, which depicts a schematic block diagram of an example of the computing device 102.

While the computing device 102 is depicted in FIG. 2 as a single component, the computing device 102 may be distributed among a plurality of components and the like including, but not limited to, any suitable combination of one or more servers, one or more cloud computing devices, and the like.

As depicted, the computing device 102 comprises: a communication interface 202, a processing unit 204, a Random-Access Memory (RAM) 206, one or more wireless transceivers 208 (e.g., which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the computing device 102 may have any suitable structure and/or configuration.

Furthermore, a portion of the memory 220 may comprise the memory 120.

While not depicted, the computing device 102 may include, and/or be in communication with, one or more of a display screen and an input component (and/or any other suitable combination of input and/or output components) and the like, such as the display screen 114 and the input device 116.

As shown in FIG. 2, the computing device 102 includes the communication interface 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100. For example, the communication interface 202 may include one or more wired and/or wireless transceivers 208 for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

It is understood that while DMR transceivers, P25 transceivers, and TETRA transceivers may be particular to first responders, in some examples, the system 100 may be operated by a first responder entity (e.g., such as a police department, a fire department, an emergency medical services department, and the like), and hence such transceivers may be used for communications.

The communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality for enabling data exchanges. For example, in some examples, the computing device 102 and/or the controller 218 specifically comprises a computer executable engine configured to implement functionality for enabling data exchanges.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the computing device 102 as described herein are maintained, persistently, at the memory 220 and used by the controller 218, which makes appropriate utilization of volatile storage during the execution of such programming instructions.

Regardless, it is understood that the memory 220 stores instructions corresponding to the at least one application 222 that, when executed by the controller 218, enables the controller 218 to implement functionality particular to the computing device 102. Furthermore, while not depicted, the application 222 may include modules corresponding to engines 140, 142, 144, 146 that enables the controller 218 to implement functionality particular to the engines 140, 142, 144, 146.

Figure 3:
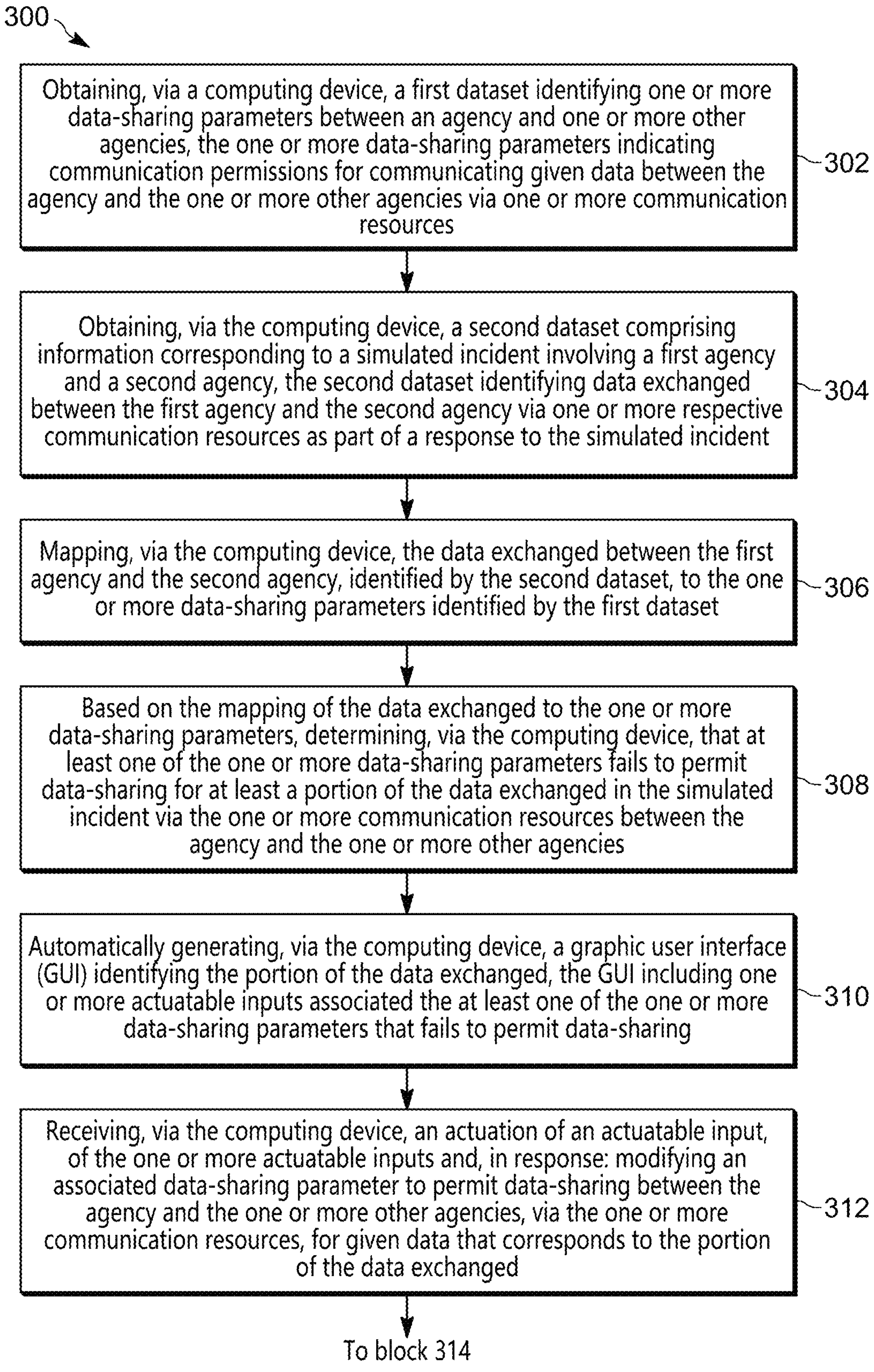
FIG. 3 is a flowchart of a first portion of a method for enabling data exchanges, in accordance with some examples.
Figure 4:
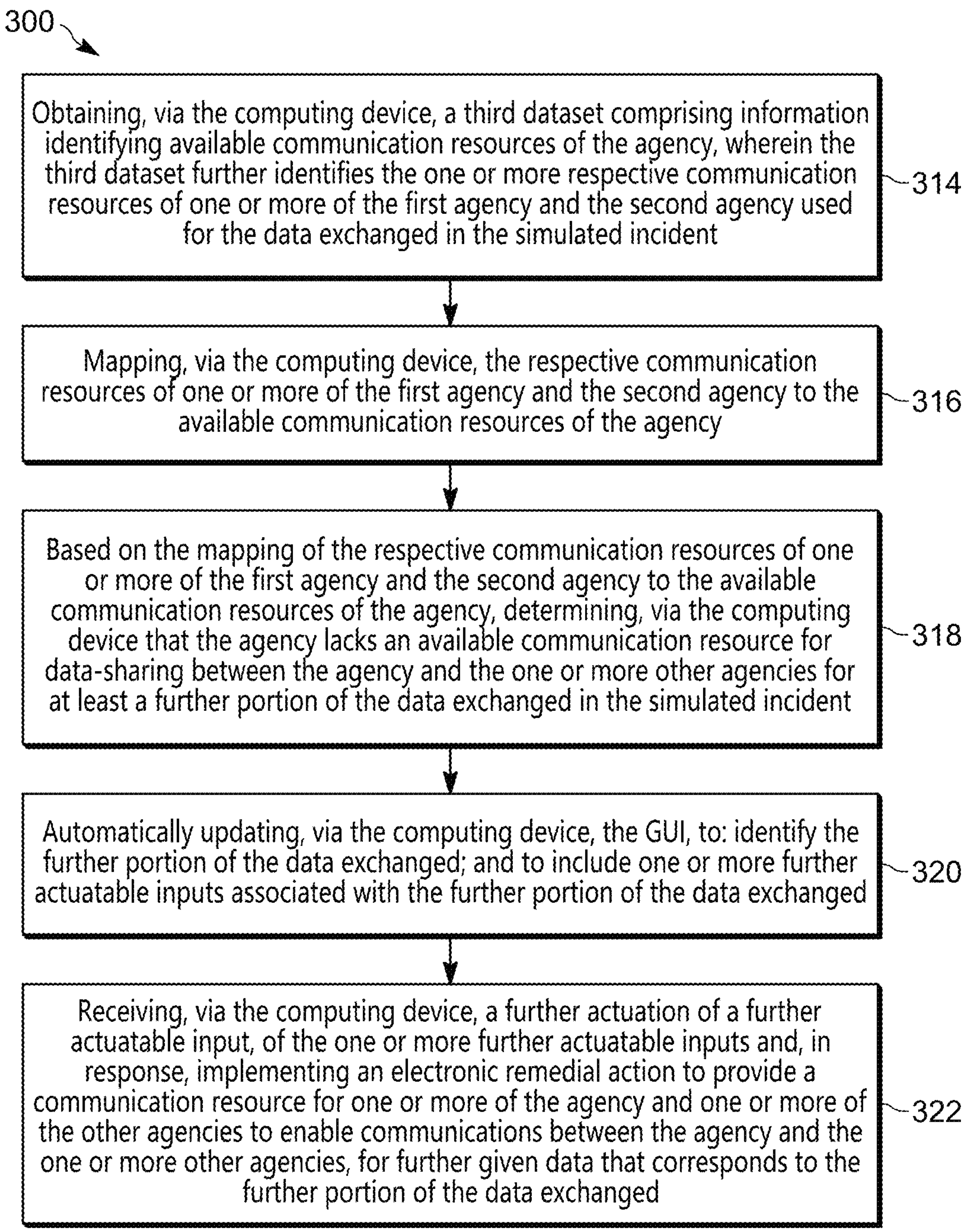
FIG. 4 is a flowchart of a second portion of the method for enabling data exchanges, in accordance with some examples.

For example, the memory 220 stores instructions corresponding to the at least one application 222 that, when executed by the controller 218, enables the controller 218 to implement functionality, including, but not limited to, certain blocks of the method set forth in FIG. 3 and FIG. 4.

The application 222 and/or one or more of the engines 140, 142, 146 may include programmatic algorithms, and the like, to implement functionality as described herein.

Alternatively, and/or in addition to programmatic algorithms, the application 222 and/or the one or more of the engines 140, 142, 144, 146 may include one or more machine learning algorithms to implement functionality as described herein. In particular, the LLM engine 144 may be implemented as a large language machine learning model.

Furthermore, the one or more machine learning algorithms of the application 222 and/or the engines 140, 142, 146 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. Any suitable machine learning algorithm and/or deep learning algorithm and/or neural network is within the scope of present examples.

Furthermore, in examples where the application 222 and/or the one or more of the engines 140, 142, 144, 146 includes one or more machine learning algorithms, the application 222 and/or the one or more of the engines 140, 142, 144, 146 may be operated in a training mode to train the application 222 and/or the one or more of the engines 140, 142, 144, 146 to implement the functionality described herein. For example, after implementing the method described with respect to FIG. 3 and FIG. 4, the input and output from the application 222 and/or the one or more of the engines 140, 142, 144, 146 may be labeled as positive training data (e.g., when the output corresponds to a correct decision by the application 222 and/or the one or more of the engines 140, 142, 144, 146) or negative training data (e.g., when the output does not correspond to a correct decision by the application 222 and/or the one or more of the engines 140, 142, 144, 146), and used to train from the application 222 and/or the one or more of the engines 140, 142, 144, 146.

Attention is next directed to FIG. 3 and FIG. 4, which depict a method for enabling data exchanges. The operations of the method 300 of FIG. 3 and FIG. 4 correspond to machine readable instructions that are executed by the controller 218 and/or at least one computing device 102. In the illustrated example, the instructions represented by the blocks of FIG. 3 and FIG. 4 are stored at the memory 220 for example, as the application 222. The method 300 of FIG. 3 is one way in which the controller 218 and/or the at least one computing device 102 and/or the system 100 may be configured. Furthermore, the following discussion of the method 300 of FIG. 3 and FIG. 4 will lead to a further understanding of the system 100, and its various components.

The method 300 of FIG. 3 and FIG. 4 need not be performed in the exact sequence as shown and likewise various blocks may be performed in parallel rather than in sequence. Accordingly, the elements of method 300 are referred to herein as "blocks" rather than "steps". The method 300 of FIG. 3 and FIG. 4 may be implemented on variations of the system 100 of FIG. 1, as well.

Attention is first directed to FIG. 3 at which a first portion of the method 300 is described.

At a block 302, the controller 218, and/or the computing device 102, obtains the first dataset 131 identifying one or more data-sharing parameters 130 between an agency 106 and one or more other agencies 106, the one or more data-sharing parameters 130 indicating communication permissions for communicating given data between the agency 106 and the one or more other agencies 106 via one or more communication resources 104.

For example, the controller 218, and/or the computing device 102 may request and receive the first dataset 131 from the memory 120.

At a block 304, the controller 218, and/or the computing device 102, obtains a second dataset 132 comprising information corresponding to a simulated incident involving a first agency 106 and a second agency 106, the second dataset 132 identifying data exchanged between the first agency 106 and the second agency 106 via one or more respective communication resources 104 as part of a response to the simulated incident.

For example, the controller 218, and/or the computing device 102 may request and receive the second dataset 132 from the memory 120.

At a block 306, the controller 218, and/or the computing device 102, maps the data exchanged between the first agency 106 and the second agency 106, identified by the second dataset 132, to the one or more data-sharing parameters 130 identified by the first dataset 131.

The mapping of the block 306 may be performed via the mapping engine 142, for example using the second dataset 132 and the one or more data-sharing parameters 130 identified by the first dataset 131 as input to the mapping engine 142, which may output associations between data exchanges in the simulated incident to data-sharing parameters 130 identified by the first dataset 131.

At a block 308, the controller 218, and/or the computing device 102, based on the mapping of the data exchanged to the one or more data-sharing parameters 130, determines that at least one of the one or more data-sharing parameters 130 fails to permit data-sharing for at least a portion of the data exchanged in the simulated incident via the one or more communication resources 104 between the agency 106 and the one or more other agencies 106.

In response to determining the at least one of the one or more data-sharing parameters 130 fails to permit data-sharing as determined at the block 308, at a block 310, the controller 218 and/or the computing device 102: automatically generates a graphic user interface (GUI) 118 identifying the portion of the data exchanged, the GUI 118 including one or more actuatable inputs associated the at least one of the one or more data-sharing parameters 130 that fails to permit data-sharing.

Generating of the GUI 118 at the block 308 may include, but is not limited to, updating the GUI 118 as indicated, for example when the GUI 118 is already being provided at the display screen 114.

At a block 312, the controller 218, and/or the computing device 102, receives an actuation of an actuatable input, of the one or more actuatable inputs and, in response: modifying an associated data-sharing parameter 130 to permit data-sharing between the agency 106 and the one or more other agencies 106, via the one or more communication resources 104, for given data that corresponds to the portion of the data exchanged.

The actuation of the block 312 may occur via the operator 112 interacting with the input device 116.

In some examples, at the block 312, modifying the associated data-sharing parameter 130 to permit the data-sharing between the agency 106 and the one or more other agencies 106 may comprise: providing, at the GUI 118, at least two options for modifying the associated data-sharing parameter 130; receiving, via an input device, a selection of one option, of the at least two options; and modifying the associated data-sharing parameter 130 according to the selection of the one option of the at least two options.

Alternatively, or in addition, at the block 312, modifying the associated data-sharing parameter 130 to permit the data-sharing between the agency 106 and the one or more other agencies 106 may comprise: generating, using a large language model, a modification to the associated data-sharing parameter 130 that permits the data-sharing between the agency 106 and the one or more other agencies 106; and modifying the associated data-sharing parameter 130 according to the modification.

Put another way, the LLM engine 144 may be used to generate the modification to the associated data-sharing parameter 130.

Attention is next directed to FIG. 4, which continues to describe the method 300. It is understood that the portion of the method 300 depicted in FIG. 4 may occur after the block 312, and/or in parallel with any of the blocks 302, 304, 306, 308, 310, 312. It is further understood that in some examples, at the block 308, the controller 218, and/or the computing device 102, may determine that all of the data-sharing parameters 130 permit data-sharing for at least a portion of the data exchanged in the simulated incident via the one or more communication resources 104 between the agency 106 and the one or more other agencies 106; in these examples, the blocks 310, 312 may not be implemented, but the portion of the method 300 depicted in FIG. 4 may be implemented.

At a block 314, the controller 218, and/or the computing device 102, obtains a third dataset 133 comprising information identifying available communication resources 104 of the agency 106, wherein the third dataset 133 further identifies the one or more respective communication resources 104 of one or more of the first agency 106 and the second agency 106 used for the data exchanged in the simulated incident.

For example, the controller 218, and/or the computing device 102 may request and receive the third dataset 133 from the memory 120.

At a block 316, the controller 218, and/or the computing device 102, maps the respective communication resources 104 of one or more of the first agency 106 and the second agency 106 to the available communication resources 104 of the agency 106.

The mapping of the block 316 may be performed via the mapping engine 142, for example using the second dataset 132 and the third dataset 133 as input to the mapping engine 142, which may output associations between communication resources used in data exchanges in the simulated incident to communication resources 104 of the agency 106 (e.g., and/or the one or more other agencies 106).

At a block 318, the controller 218, and/or the computing device 102, based on the mapping of the respective communication resources 104 of one or more of the first agency 106 and the second agency 106 to the available communication resources 104 of the agency 106, determines that the agency 106 lacks an available communication resource 104 for data-sharing between the agency 106 and the one or more other agencies 106 for at least a further portion of the data exchanged in the simulated incident.

In response to determining the agency 106 lacks an available communication resource for data-sharing of the further portion of the data exchanged (e.g., at the block 318), at a block 320, the controller 218, and/or the computing device 102, automatically updates the GUI 118, to: identify the further portion of the data exchanged; and to include one or more further actuatable inputs associated with the further portion of the data exchanged.

At a block 322, the controller 218, and/or the computing device 102, receives a further actuation of a further actuatable input, of the one or more further actuatable inputs and, in response, implementing an electronic remedial action to provide a communication resource 104 for one or more of the agency 106 and the one or more other agencies 106 to enable communications between the agency 106 and the one or more other agencies 106, for further given data that corresponds to the further portion of the data exchanged.

The actuation of the block 318 may occur via the operator 112 interacting with the input device 116.

Furthermore, the electronic remedial action of the block 318 may occur via the electronic remedial action engine 146, which may receive, as input, an identifier of a type of the further portion of the data exchanged, an identifier of a type of communication resource 104 that may be used for successful sharing of the further portion of the data exchanged, and/or any other suitable information, such as the available communication resources 104 of the agency 106, and output commands and/or program code for implementing the electronic remedial action of the block 318.

For example, the electronic remedial action to provide the communication resource 104 may comprise one or more of: replacing the available communication resource 104 with the communication resource 104; provisioning the communication resource 104 to an officer of the agency 106; enabling an alternate communication resource 104 associated with the officer as the communication resource 104; and enabling a personal communication resource of the officer as the communication resource 104.

For example, replacing the available communication resource 104 with the communication resource 104 may comprise replacing the available communication resource 104 is unable to implement a certain type of data sharing, such as receiving video, with a communication resource 104 is capable of the certain type of data sharing, such as receiving video. For example, such an electronic remedial action may include controlling a provisioning computing device to perform the replacement.

Similarly, provisioning the communication resource 104 to an officer of the agency 106 may comprise controlling a provisioning computing device to provision a communication resource 104 is capable of the certain type of data sharing, such as receiving video, to an officer of the agency 104 so that the data sharing of the block 318 may occur via the officer operating the communication resource 104.

Furthermore, enabling an alternate communication resource 104 associated with the officer as the communication resource 104 may comprise installing an application that is capable of the certain type of data sharing at the communication resource of the officer, such as a mobile device of the officer (and/or a terminal, such as the terminal 110; in this example, the officer may be the operator 112).

Furthermore, enabling a personal communication resource of the officer as the communication resource 104 may comprise authorizing personal communication resource of the officer, such as a personal cell phone and/or mobile device, to be used in conjunction with future incidents. Such enabling a personal communication resource of the officer may include, but is not limited to, authorizing and/or registering the personal communication resource of the officer for use in communication between the agencies 106.

The method 300 may include other features.

The method 300 may further comprise, the controller 218, and/or the computing device 102: simulating the simulated incident involving the first agency 106 and the second agency 106, to obtain the second dataset 132. Such a simulation may occur via the simulation engine 140 as has been previously described, for example using the fourth dataset 134.

In some examples, the GUI 118 may be map-based, showing locations of the agency 106, and the one or more other agencies 106, and data exchanges between the agency 106 and the one or more other agencies 106. An example of such a map-based GUI 118 is described with respect to FIG. 13, FIG. 14 and FIG. 16.

In other examples, the GUI 118 may be timeline-based, indicating sequences of data exchanges between the agency 106 and the one or more other agencies 106, based on the mapping. An example of such a timeline-based GUI 118 is described with respect to FIG. 18.

The method 300 is next described with respect to FIG. 5 to FIG. 18. FIG. 5, FIG. 6, FIG. 8, FIG. 10, FIG. 11, FIG. 12, FIG. 15, and FIG. 17 are substantially similar to FIG. 1, with like components having like numbers. Furthermore, for simplicity, the respective portions of the method 300 described with respect to FIG. 3 and FIG. 4 are described interlaced with each other, though they may be implemented independent of each other.

Furthermore, it is understood that the provided examples will assume that the computing device 102 is attempting to permit data sharing between respective communication resources 104 of a given agency 106-1 and any suitable subset of the other agencies 106. It is assumed in the following example that the given agency 106-1 comprises a police agency, and the other agencies 106 may be any suitable types of agencies and/or specific agencies types as described hereafter.

Figure 5:
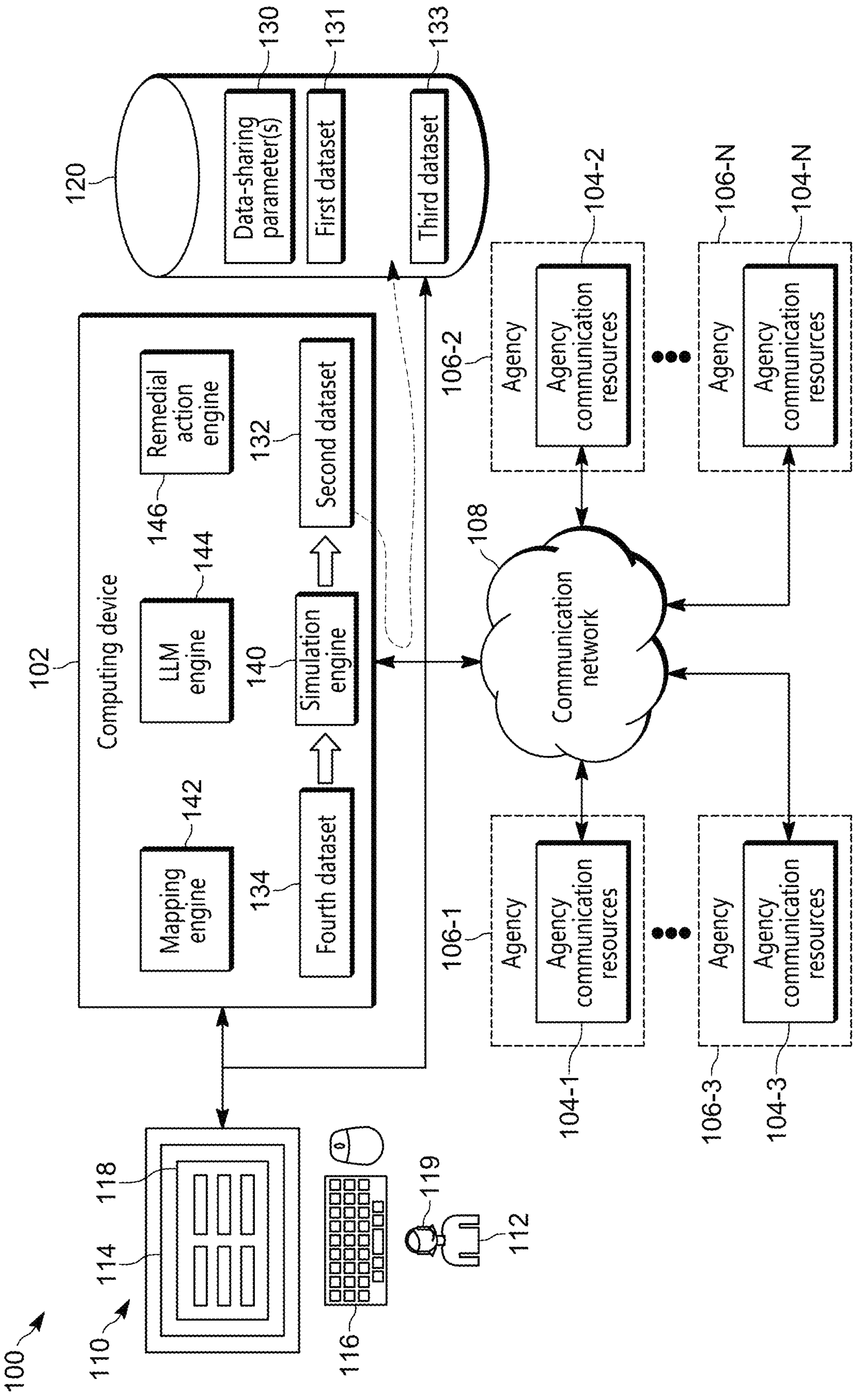
FIG. 5 depicts the system of FIG. 1 implementing of aspects a method for enabling data exchanges, in accordance with some examples.

Attention is first directed to FIG. 5, which depicts the computing device 102 generating the second dataset 132. For example, as depicted, the computing device 102 has obtained the fourth dataset 134 and is providing the fourth dataset 134 as input to the simulation engine 140, which outputs the second dataset 132. The computing device 102 stores the second dataset 132 at the memory 120. Put another way, the computing device 102 uses the fourth dataset 134 to simulate an incident between two or more agencies, and outputs the second dataset 132 comprising information corresponding to the simulated incident.

Figure 6:
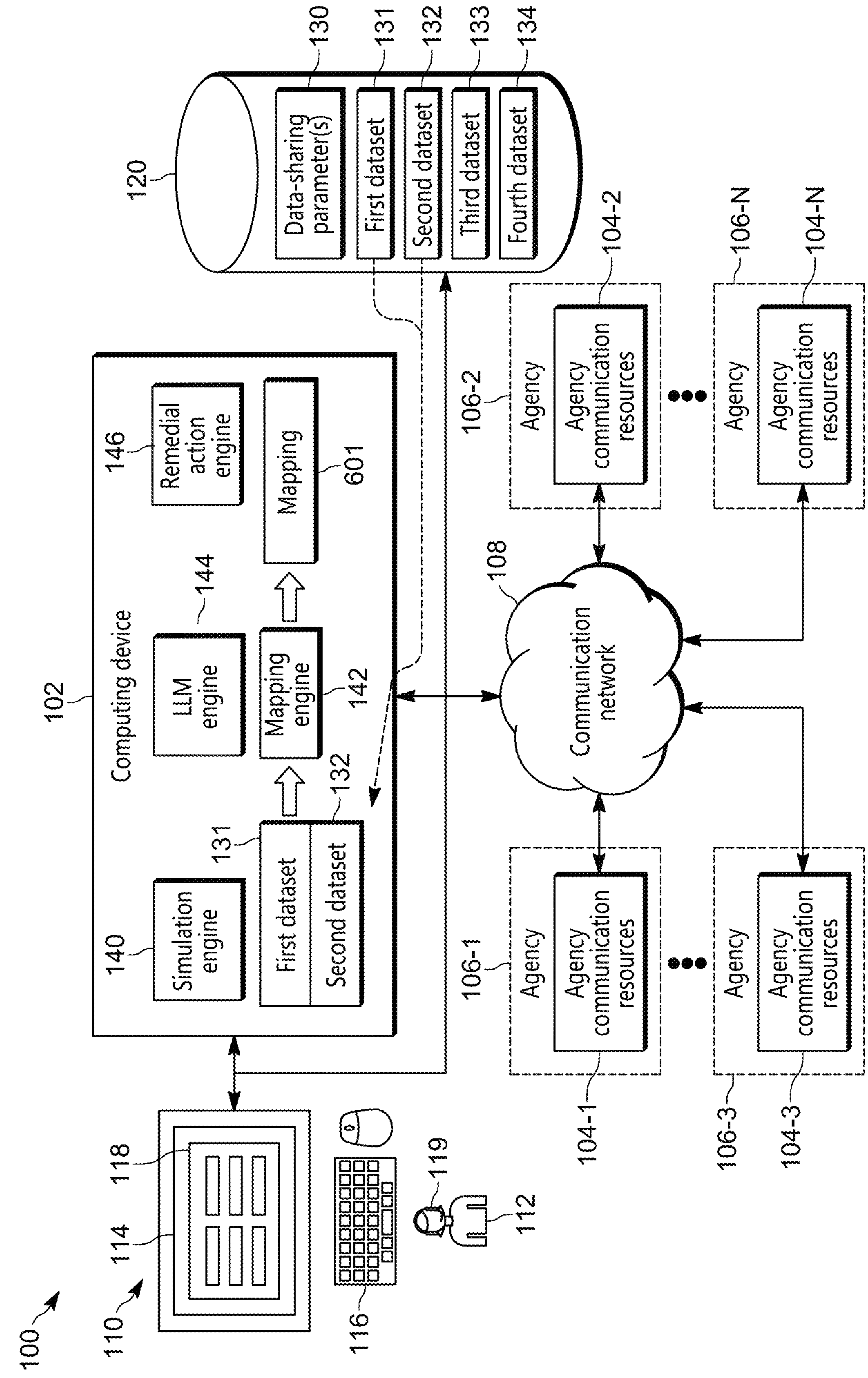
FIG. 6 depicts the system of FIG. 1 implementing further aspects of a method for enabling data exchanges, in accordance with some examples.

Attention is next directed to FIG. 6, which depicts the computing device 102 obtaining (e.g., at the block 302 and the block 304 of the method 300), the first dataset 131 and the second dataset 132 from the memory 120.

The computing device 102 maps (e.g., at the block 306 of the method 300) the data exchanged between the agencies in the simulated incident, as identified by the second dataset 132, to the one or more data-sharing parameters 130 identified by the first dataset 131. In particular, the computing device 102 provides the datasets 131, 132 as input to the mapping engine 142, which outputs a mapping 601.

Figure 7:
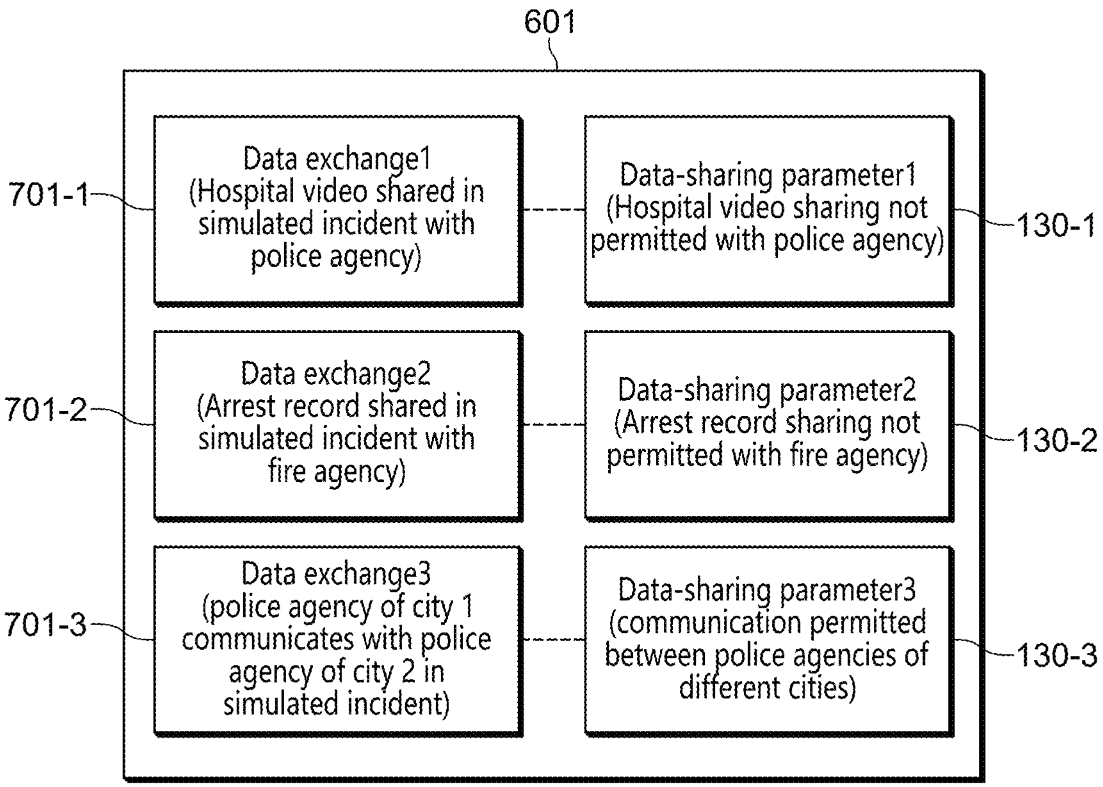
FIG. 7 depicts a mapping between data exchanged in a simulated incident, to data-sharing parameters of one or more agencies, in accordance with some examples.

Attention next directed to FIG. 7, which depicts an example of the mapping 601 showing three data-sharing parameters 130-1, 130-2, 130-3 mapped to three respective data exchanges in the simulated incident, as indicated by dashed lines therebetween.

For example, a first data exchange 701-1 (e.g., also labeled "Data Exchange1") in the simulated incident, indicated by "Hospital Video Shared In Simulated Incident With Police Agency", has been mapped to a first data-sharing parameter 130-1 (e.g., also labeled "Data-Sharing Parameter1") of "Hospital Video Sharing Not Permitted With Police Agency".

Similarly, a second data exchange 701-2 (e.g., also labeled "Data Exchange2") in the simulated incident, indicated by "Arrest Record Shared In Simulated Incident With Fire Agency", has been mapped to a second data-sharing parameter 130-2 (e.g., also labeled "Data-Sharing Parameter2") of "Arrest Record Sharing Not Permitted With Fire Agency".

It is understood that the data exchanges 701-1, 701-2 are respectively mapped to data-sharing parameter 130-1, 130-2 which do not permit similar data exchanges between the given agency 106-1 and at least a portion of the other agencies 106.

For completeness, the mapping 601 further shows a third data exchange 701-3 (e.g., also labeled "Data Exchange3") in the simulated incident, indicated by "Police Agency of City 1 Communicates with Police Agency Of City 2 In Simulated Incident", which has been mapped to a third data-sharing parameter 130-3 (e.g., also labeled "Data-Sharing Parameter3") of "Communication Permitted Between Police Agencies Of Different Cities".

It is understood that the third data exchange 701-3 is mapped to the third data-sharing parameter 130-3, which does permit a similar data exchange between the given agency 106-1 and police agencies of the other agencies 106.

Figure 8:
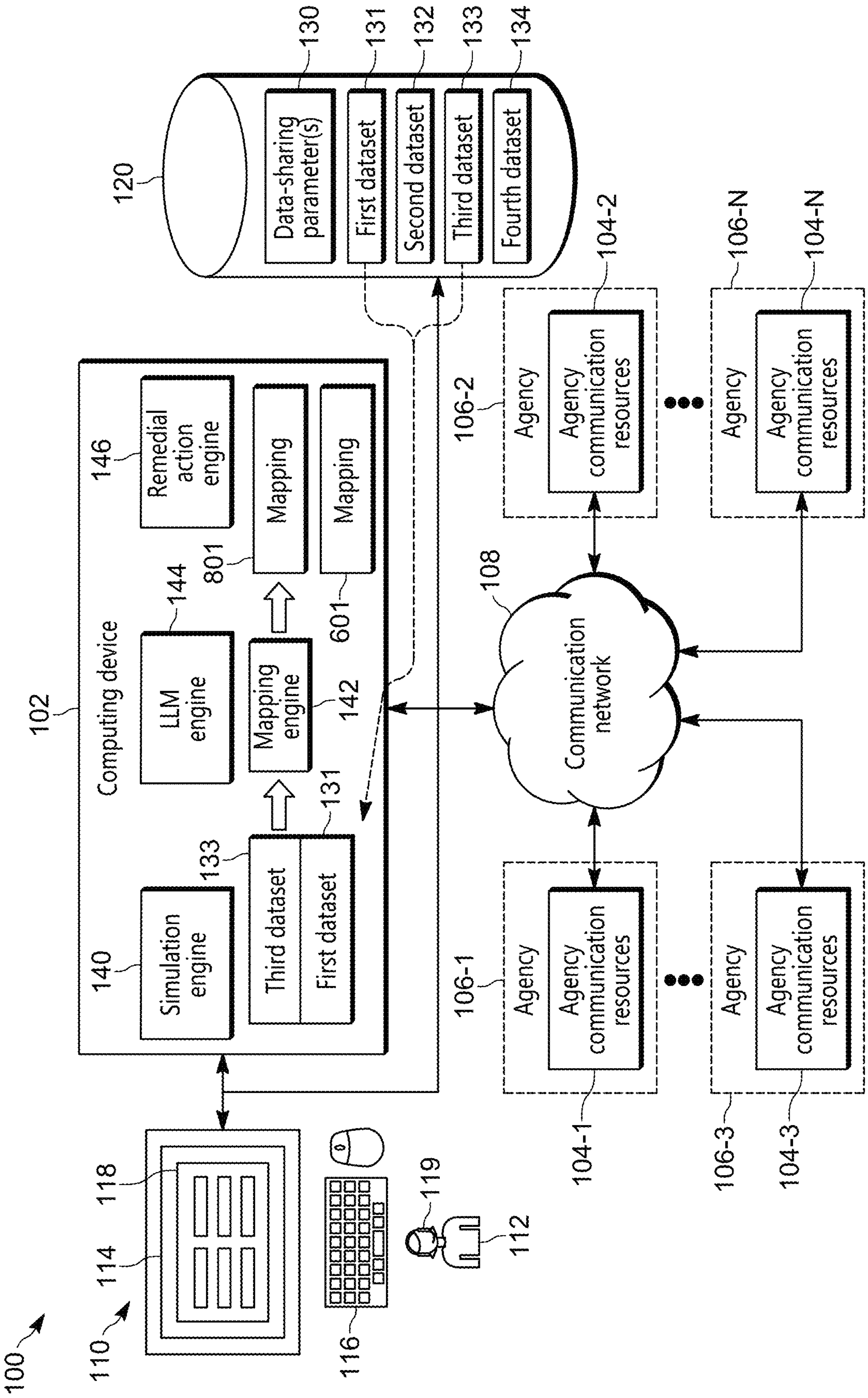
FIG. 8 depicts the system of FIG. 1 implementing further aspects of a method for enabling data exchanges, in accordance with some examples.

Attention is next directed to FIG. 8, which depicts the computing device 102 obtaining (e.g., at the block 302 and the block 314 of the method 300), the first dataset 131 and the third dataset 133 from the memory 120. It is further understood in FIG. 8 that the computing device 102 continues to have access to the mapping 601.

The computing device 102 maps (e.g., at the block 316 of the method 300) the computing resources of the one or more of the agencies of the simulated incident, as identified the third dataset 133, to the one or more communication resources 104 of the given agency 106 and/or the other agencies 106. In particular, the computing device 102 provides the datasets 131, 133 as input to the mapping engine 142, which outputs a mapping 801.

Figure 9:
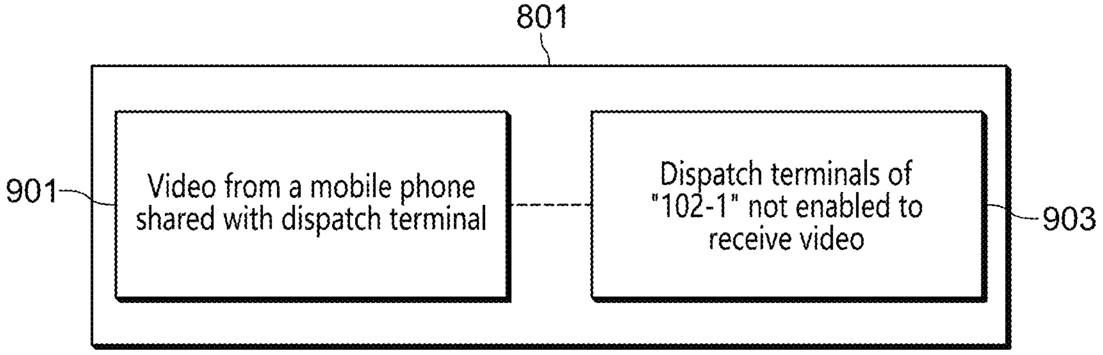
FIG. 9 depicts a mapping between respective communication resources used in the simulated incident to available communication resources of one or more agencies, in accordance with some examples.

Attention next directed to FIG. 9 which depicts an example of the mapping 801 of an indication 901 of communication resources of the agencies of the simulated incident mapped to an indication 903 of communication resources 104-1 of the given agency 106-1. In particular, the indication 901 of communication resources of the agencies of the simulated incident indicates "Video From A Mobile Phone Shared With Dispatch Terminal" in the simulated incident. Furthermore, the indication 903 of communication resources 104 of the given agency 106-1 indicate that "Dispatch Terminals Of "102-1" Not Enabled To Receive Video", indicating that communication resources 104-1, of the given agency 106-1, that comprise terminals are not enabled to receive video.

Figure 10:
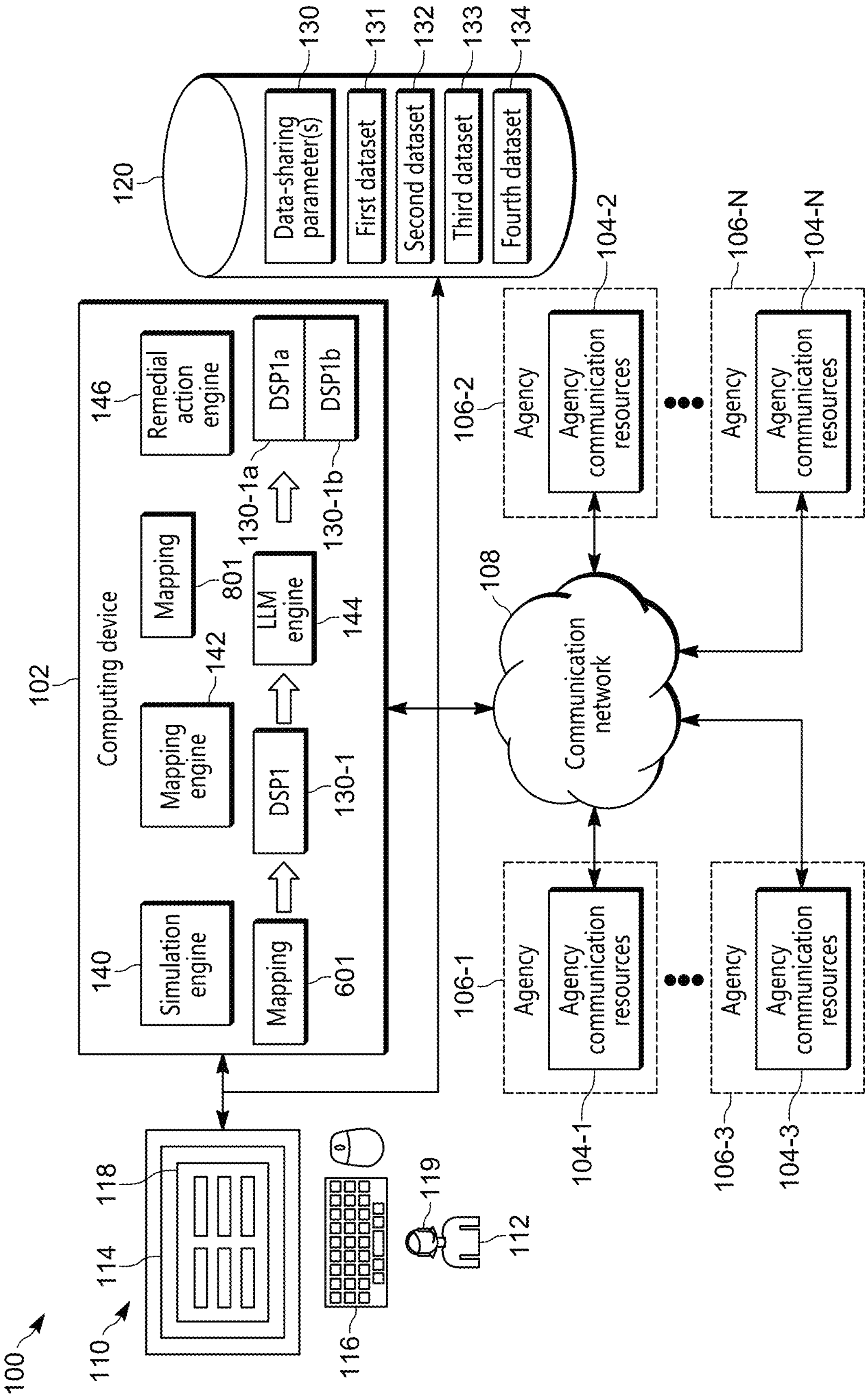
FIG. 10 depicts the system of FIG. 1 implementing further aspects of a method for enabling data exchanges, in accordance with some examples.

Attention is next directed to FIG. 10, which depicts the computing device 102 determining (e.g., at the block 308 of the method 300), based on the mapping 601, that the first data-sharing parameter 103-1 of the mapping 601 fails to permit data-sharing for at least a portion of the data exchanged in the simulated incident. In particular, a data exchange corresponding to the first data exchange 701-1 would not be permitted amongst the agencies 106 that includes a hospital agency as the first data-sharing parameter 103-1 indicates that "Hospital Video Sharing Not Permitted With Police Agency".

Figure 14:
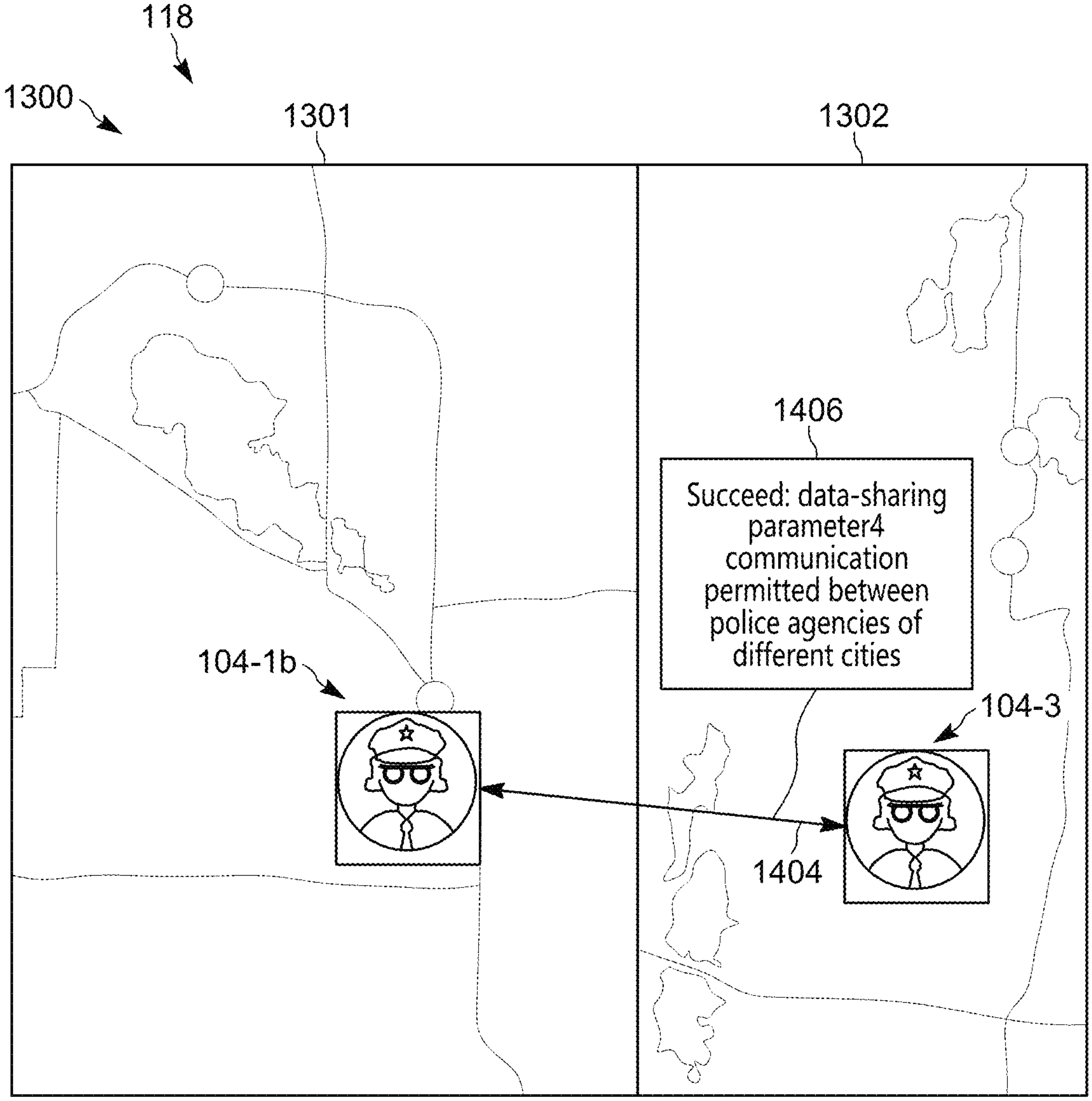
FIG. 14 depicts a map-based GUI indicating successful data sharing, in accordance with some examples.

As such, the computing device 102 inputs the first data-sharing parameter 103-1 into the LLM engine 144, and the LLM engine 144 outputs two modified data sharing parameters **130-1*a*, 130-1*b*** (also respectively labeled DSP1*a*, DSP1*b* in FIG. 10), which are described with respect to FIG. 14. For example, the first modified data sharing parameters **130-1*a* may correspond to "Allow Hospital Video Sharing With Police Agency" and the second modified data sharing parameters 130-1*b*** may correspond to "Allow Hospital Video Sharing With Police Agency Only When Search Warrant Issued".

While not depicted, the computing device 102 may perform similar functionality for the second data exchange 701-2 and the associated second data-sharing parameter 130-2.

Figure 11:
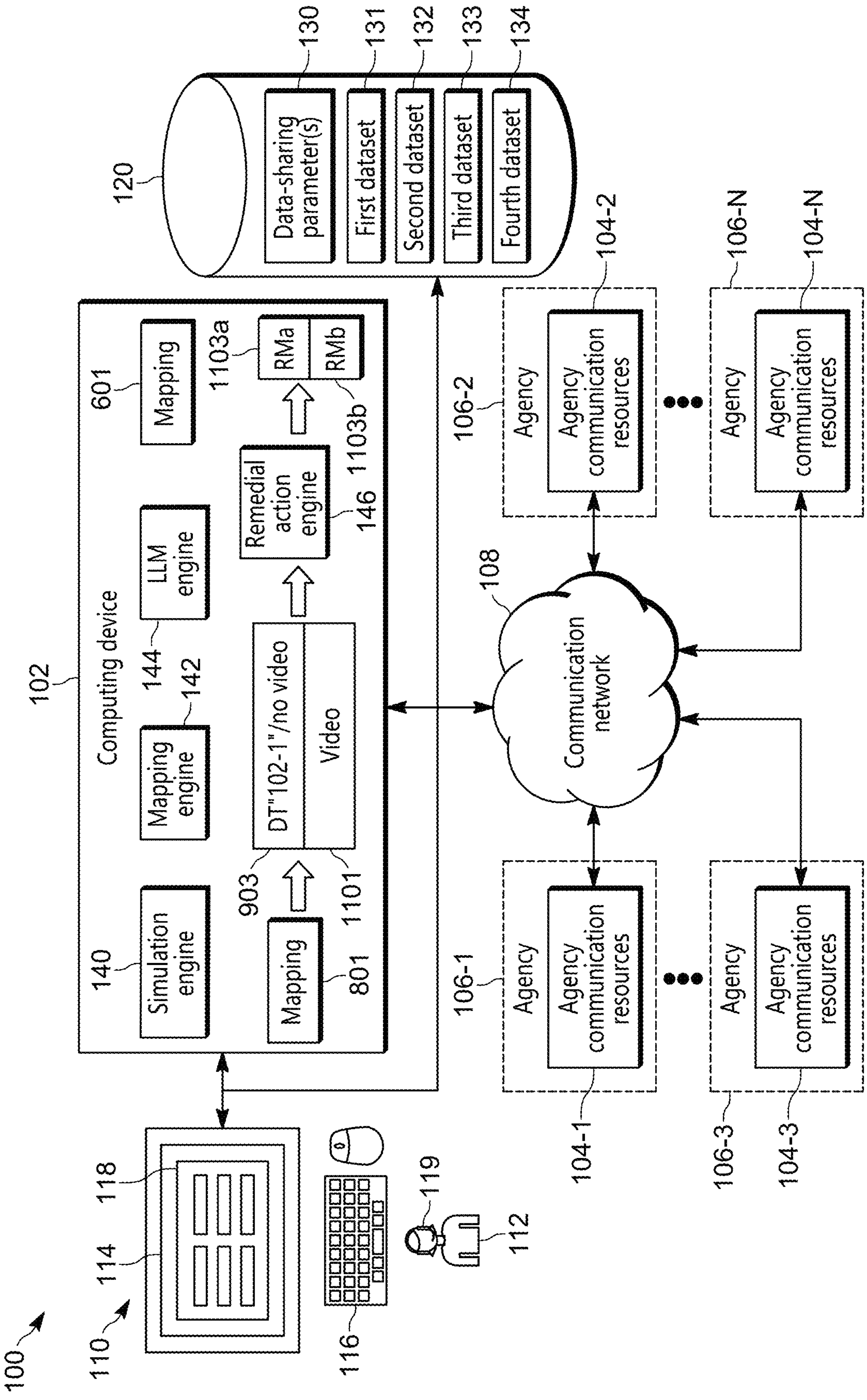
FIG. 11 depicts the system of FIG. 1 implementing further aspects of a method for enabling data exchanges, in accordance with some examples.

Attention is next directed to FIG. 11, which depicts the computing device 102 determining (e.g., at the block 318 of the method 300), based on the mapping 801, that the given agency 106-1 lacks an available communication resource 104-1 for receiving video at dispatch terminals, and inputs the indication 903 (e.g., also labeled DT "102-1" No Video for "Dispatch Terminals Of "102-1" Not Enabled To Receive Video") and an indication 1101 of a communication type of "Video" to the electronic remedial action engine 146.

Figure 16:
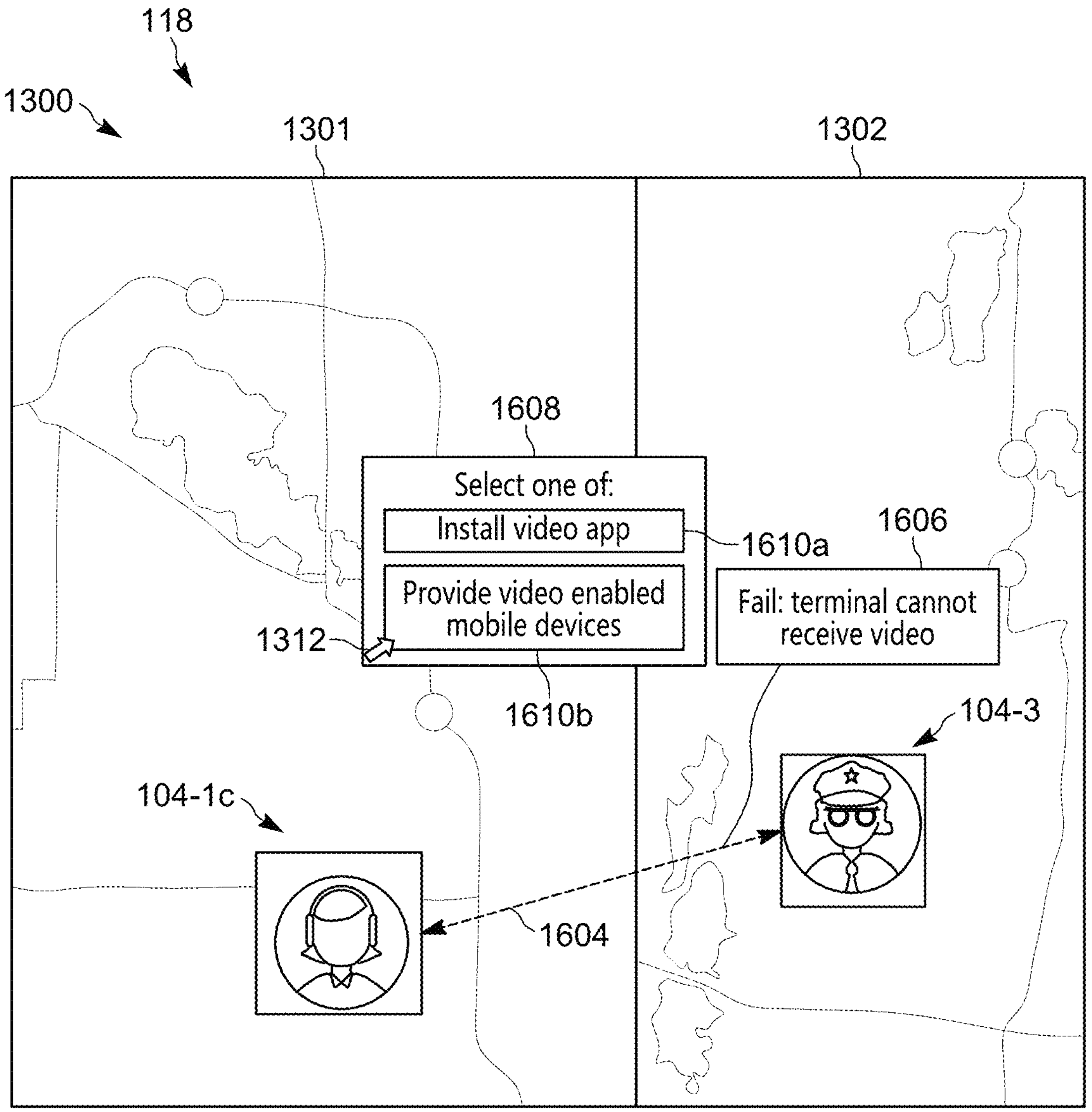
FIG. 16 depicts a map-based GUI for initiating electronic remedial actions to enable data sharing, in accordance with some examples.

The electronic remedial action engine 146 outputs program code for implementing two possible electronic remedial actions **1103*a*, 1103*b* (also respectively labeled RMa, RMb in FIG. 11), which are described with respect to FIG. 16. However, it is understood that the first electronic remedial action 1103*a* may comprise installing a video application at terminals, and the second electronic remedial action 1103*b*** may comprise provisioning terminals with video-enabled mobile devices.

Figure 12:
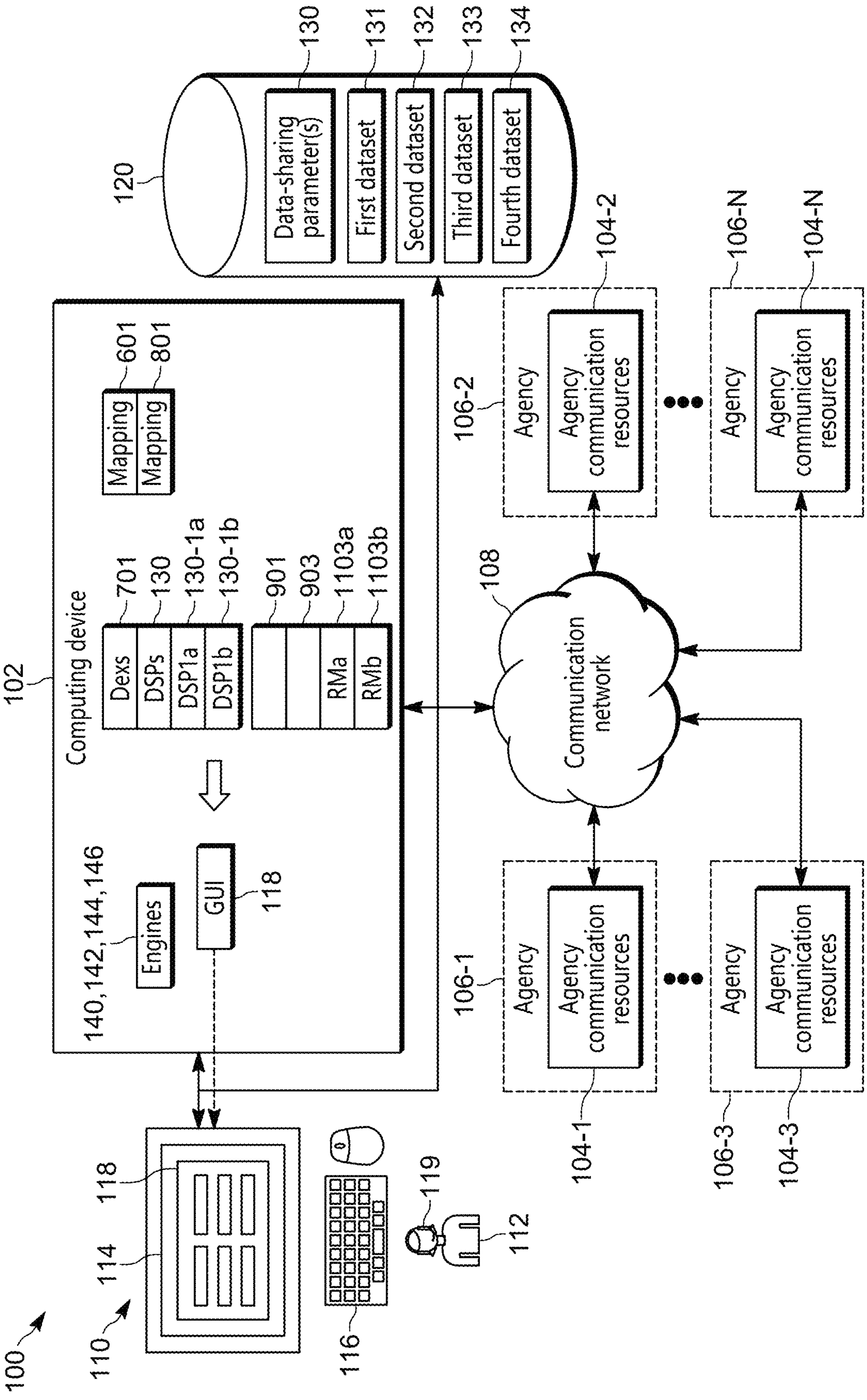
FIG. 12 depicts the system of FIG. 1 implementing further aspects of a method for enabling data exchanges, in accordance with some examples.

Attention is next directed to FIG. 12, which depicts an example of the block 310 and the block 320 of the method 300. Furthermore, in FIG. 12, and hereafter, the engines 140, 142, 144, 146 are depicted as grouped together merely for simplicity.

In particular, the computing device 102 generates the GUI 118 using (e.g., at the block 310 of the method 300) the data exchanges 701 and the mapped data-sharing parameters 130, as well as the modified data sharing parameters **130-1*a*, 130-1*b*, and using (e.g., at the block 320 of the method 300) the indication 901, 903 and the electronic remedial actions 1103*a*, 1103*b***.

Figure 13:
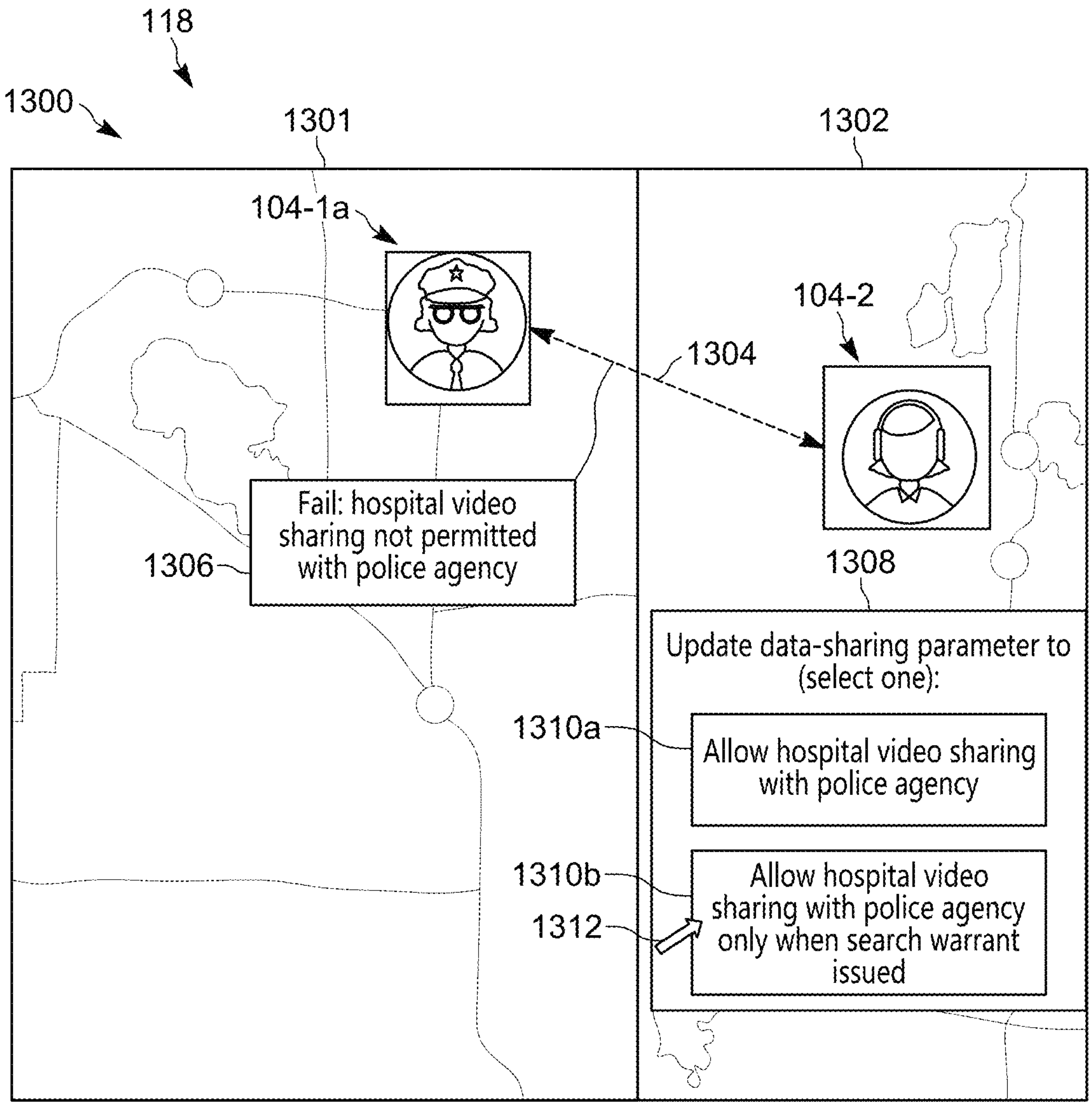
FIG. 13 depicts a map-based graphic user interface (GUI) for modifying data-sharing parameters to enable data sharing, in accordance with some examples.

Attention is next directed to FIGS. 13 and 14, which depicts a portion of the GUI 118, for example in a map-based mode, that may be provided at the display screen 114 with respect to the data exchanges 701, the mapped data-sharing parameters 130, as well as the modified data sharing parameters **130-1*a*, 130-1*b***.

For example, FIG. 13 depicts respective locations of a communication resource **104-1*a* of the given agency 106-1 and a communication resource 104-2 of a further agency 106-2 (e.g., such as a hospital) on a map 1300, with respective boundaries 1301, 1302 of jurisdictions of the agencies 106-1, 106-2. For example, as depicted, the communication resource 104-1*a* of the given agency 106-1 is located in the boundaries 1301 and is represented by an icon of a police officer, and may comprise a mobile phone operated by the police officer. Furthermore, as depicted, the communication resource 104-2 of the further agency 106-2 is located in the boundaries 1302** and is represented by an icon of a clerk at a hospital, and may comprise a terminal operated by the clerk.

The communication resources 104-1*a*, 104-2 are joined by an indicator 1304, in the form of a line, in a format (e.g., as depicted, a dashed line) indicating a failure to permit data-sharing therebetween, along with an indicator 1306 of the first data-sharing parameter 130-1, that indicates the failure, and a reason for the failure. In particular, as depicted, it is understood that the indicators 1304, 1306 indicate that a hospital video is not permitted to be shared from the communication resource 104-2 of the further agency 106-2 to the communication resource 104-1*a* of the given agency 106-1.

As depicted, the indicators 1304, 1306 are further provided with an indicator 1308 that includes two actuatable options 1310*a*, 1310*b* (e.g., electronic buttons) corresponding to the modified data-sharing parameters 130-1*a*, 130-1*b*. Hence, when the operator 112 operates the input device 116 to actuate the actuatable option 1310*a*, the first modified data-sharing parameter 130-1*a* is selected, and when the operator 112 operates the input device 116 to actuate the actuatable option 1310*b*, the second modified data-sharing parameter 130-1*b* is selected. For example, as depicted, an electronic pointer 1312 is being used to actuate the actuatable option 1310*b*, and the response to such a selection is described with respect to FIG. 15.

Attention is next directed to FIG. 14, which depicts respective locations of another communication resource 104-1*b* of the given agency 106-1 and a communication resource 104-3 of yet a further agency 106-3 (e.g., such as a police agency). It is understood in this example the further agency 106-3 is also associated with the jurisdiction indicated by the boundary 1302, and may comprise a police agency.

For example, as depicted, the communication resource 104-1*b* of the given agency 106-1 is located in the boundaries 1301 and is represented by an icon of a police officer, and may comprise a mobile phone operated by the police officer. Furthermore, as depicted, the communication resource 104-3 of the further agency 106-3 is located in the boundaries 1302 and is represented by an icon of a respective police officer, and may also comprise a mobile phone operated by the respective police officer.

The communication resources 104-1*b*, 104-3 are joined by an indicator 1404, in the form of a line, in a format (e.g., as depicted, a solid line) indicating that data-sharing is permitted therebetween, along with an indicator 1406 of the third data-sharing parameter 130-3, that indicates the success, and a reason for the success. In particular, as depicted, it is understood that the indicators 1404, 1406 indicate communication resources of the police agencies of the depicted police officers are permitted to communicate.

From FIG. 13 and FIG. 14, it is further understood that the computing device 102 may provide the indicators 1304, 1404 in different formats depending on whether the indicators 1304, 1404 indicate failure to permit data sharing, or permitted data sharing.

Figure 15:
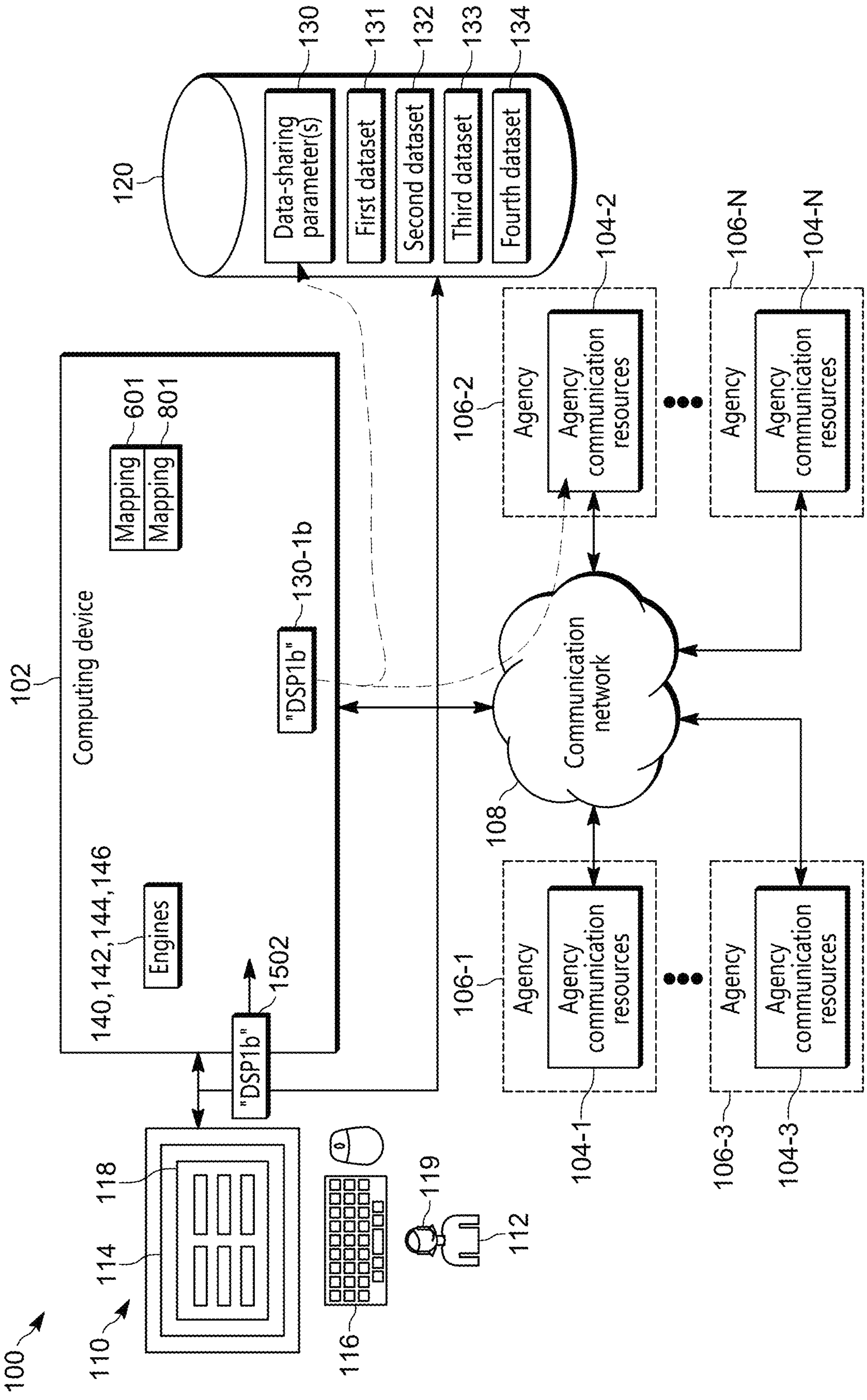
FIG. 15 depicts the system of FIG. 1 implementing further aspects of a method for enabling data exchanges, in accordance with some examples.

Attention is next directed to FIG. 15, which depicts a response from the actuation of the actuatable option 1310*b* depicted in FIG. 13. In particular, the computing device 102 receives (e.g., at the block 312 of the method 300) an indication 1502 of the actuatable option 1310*b* being actuated at the GUI 118. Indeed, as depicted, the indication 1502 identifies the second modified data-sharing parameter 130-1*b* (e.g., as indicated via text "DSP1*b*"). In response to receiving the indication 1502 of the actuation of the actuatable option 1310*b*, the computing device 102 modifies (e.g., at the block 312 of the method 300) the associated data-sharing parameter 130-1 by providing the second modified data-sharing parameter 130-1*b* to the memory 120, as well as to the communication resources 104-2 of the further agency 106-2 (e.g., via the communication network 108), for example to control the communication resources 104-2 of the further agency 106-2 to permit sharing of hospital video when a search warrant is issued. Alternatively, or in addition, the second modified data-sharing parameter 130-1*b* may be provided to the communication resources 104-2 of the further agency 106-2 in the form of computer program code that may be provided to the communication resources 104-2 of the further agency 106-2, to reprogram the communication resources 104-2 of the further agency 106-2 to permit sharing of hospital video when a search warrant is issued.

While modifying of the second data-sharing parameters 130-2 of the mapping 601 are not discussed, the second data-sharing parameters 130-2 may be modified in a similar manner, with the GUI 118 updated accordingly.

Attention is next directed to FIG. 16, which depicts respective locations of yet a further communication resource 104-1*c* of the given agency 106-1 and the communication resource 104-3 of the further agency 106-3 on the map 1300. For example, as depicted, the yet further communication resource 104-1*c* of the given agency 106-1 is located in the boundaries 1301 and is represented by an icon of a dispatcher, and may comprise a terminal operated by the dispatcher. Furthermore, as depicted, the communication resource 104-3 of the further agency 106-3 is located in the boundaries 1302 and has been previously described.

The communication resources 104-1*c*, 104-3 are joined by an indicator 1604, in the form of a line, in a format (e.g., as depicted, a dashed line) indicating a failure to permit data-sharing therebetween, along with an indicator 1606 of the first data-sharing parameter 130-1, that indicates the failure, and a reason for the failure. In particular, as depicted, it is understood that the indicators 1604, 1606 indicate that the terminal of the communication resource 104-1*c* is not enabled to receive video.

As depicted, the indicators 1604, 1606 are further provided with an indicator 1608 that includes two actuatable options 1610*a*, 1610*b* (e.g., electronic buttons) corresponding to the electronic remedial actions 1103*a*, 1103*b*. Hence, when the operator 112 operates the input device 116 to actuate the actuatable option 1610*a*, the first electronic remedial action 1103*a* is selected, and when the operator 112 operates the input device 116 to actuate the actuatable option 1610*b*, the second remedial action 1103*b* is selected. For example, as depicted, an electronic pointer 1312 is being used to actuate the actuatable option 1610*b*, and the response to such a selection is described with respect to FIG. 17.

Figure 17:
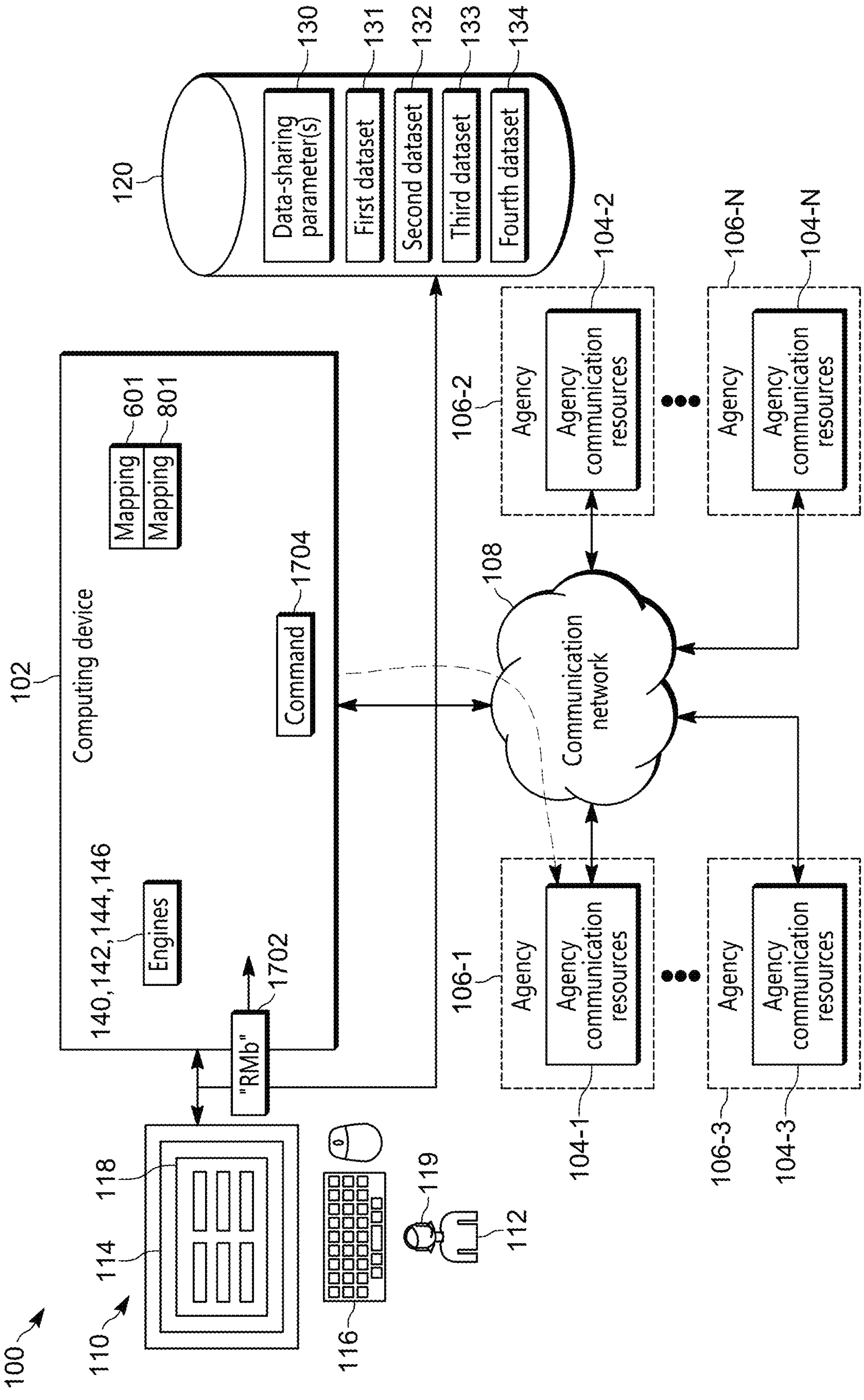
FIG. 17 depicts the system of FIG. 1 implementing further aspects of a method for enabling data exchanges, in accordance with some examples.

For example, attention is next directed to FIG. 17, which depicts a response from the actuation of the actuatable option 1610*b* depicted in FIG. 16. In particular, the computing device 102 receives (e.g., at the block 322 of the method 300) an indication 1702 of the actuatable option 1610*b* being actuated at the GUI 118. Indeed, as depicted, the indication 1702 identifies the second remedial action 1103*b* (e.g., as indicated via text "RMb"). In response to receiving the indication 1702 of the actuation of the actuatable option 1610*b*, the computing device 102 generates a command 1704 that is provided to the communication resources 104-1 of the given agency 106-1 (e.g., via the communication network 108), for example to control resources of the given agency 106-1 to provision video enabled mobile devices to operators of dispatch terminals of the communication resources 104-1 of the given agency 106-1. For example, the command 1704 may be received by a provisioning computing device (not depicted) of the given agency 106-1 that may provision such video enabled mobile devices accordingly. Furthermore, once provisioned, the third dataset 133 may be updated to indicate that communication resources 104-1 of the given agency 106-1 now include such video enabled mobile devices.

The GUI 118 may be provided in other formats and/or include other types of information. For example, examples of the GUI 118 depicted in FIG. 13, FIG. 14 and FIG. 16 may show data-sharing that may occur at different times with respect to the mapping information from the agencies 106 to the simulated incident as identified in the mappings 601, 801.

Hence, for example, the GUI 118 depicted in FIG. 13, FIG. 14 and FIG. 16 may further include times, and/or relative times of the data sharing and/or attempted data sharing by the various communication resources 104 (e.g., as indicated by the second dataset 132).

Similarly, the simulated incident may indicate (e.g., via the second dataset 132) events that may trigger the various data sharing and/or attempted data sharing of the various communication resources 104, and the GUI 118 depicted in FIG. 13, FIG. 14 and FIG. 16 may be adapted accordingly.

Furthermore, the GUI 118 may be provided in a format other than map-based. For example, attention is next directed to FIG. 18, which depicts a timeline-based version of the GUI 118 and showing the various data-sharing of the GUI 118 as depicted in FIG. 13, FIG. 14 and FIG. 16. Put another way, in FIG. 18, the GUI 118 is understood to be in a time-line based mode.

Figure 18:
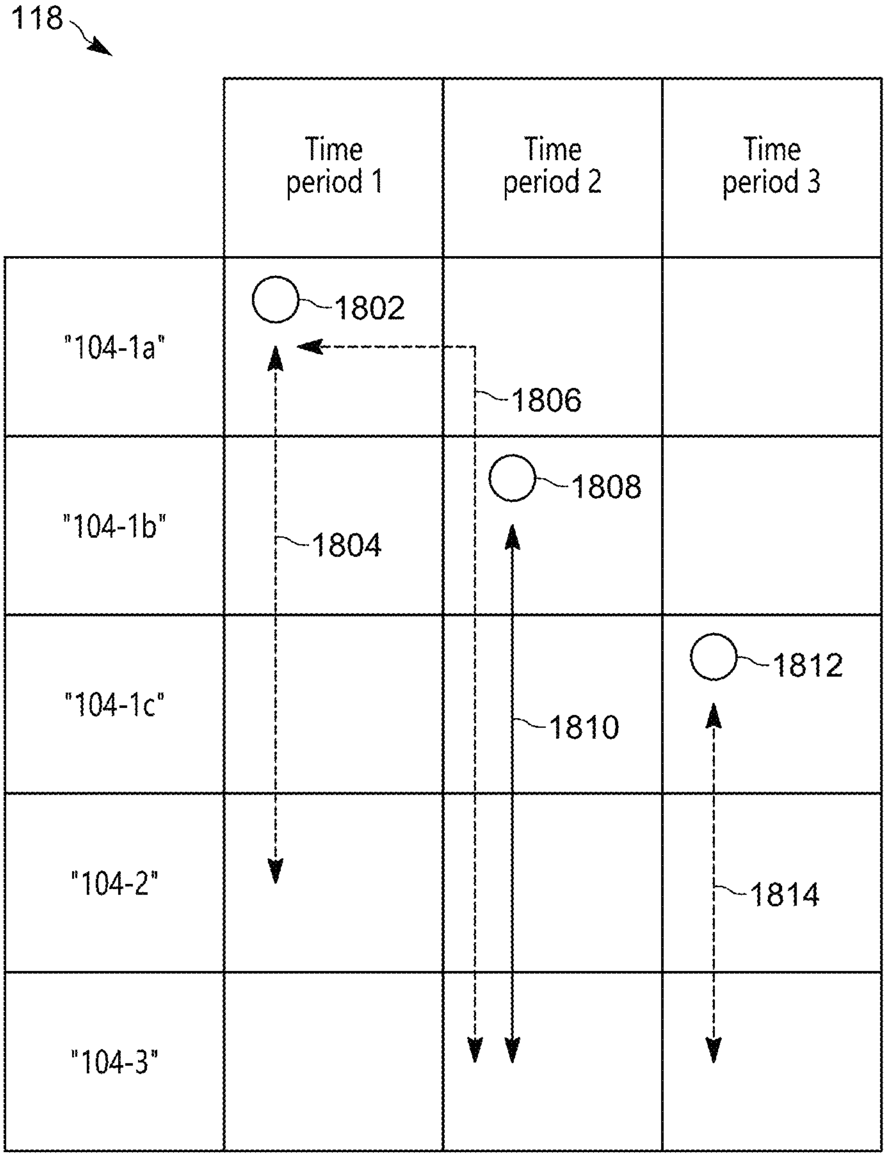
FIG. 18 depicts a timeline-based graphic user interface (GUI) for modifying data-sharing parameters to enable data sharing, in accordance with some examples.

Rows of the example GUI 118 of FIG. 18 include respective identifiers "104-1*a*", "104-1*b*", "1041*c*", "104-2", "104-3" of the various communication resources 104-1*a*, 104-1*b*, 104-1*c*, 104-2, 104-3. Columns of the example GUI 118 of FIG. 18 include time periods of the simulated incident. Such time periods are depicted as "Time Period 1", "Time Period 2" and "Time Period 3", and may be of 15 minutes each, 30 minutes each, 60 minutes each, amongst other possibilities, for example with "Time Period 1", "Time Period 2" and "Time Period 3" being consecutive time periods (e.g., with the "Time Period 1" preceding "Time Period 2", and "Time Period 2" preceding "Time Period 3". However, the example GUI 118 of FIG. 18 may include any suitable number of time periods of any suitable duration.

Furthermore, in contrast to the GUI 118 depicted in FIG. 13, FIG. 14 and FIG. 16, the example GUI 118 of FIG. 18 includes circles that may correspond to events that occurred in the simulated incident, and actuation of a circle may cause an identifier of a respective event to be at least temporarily provided at the GUI 118, for example in a text box.

As depicted, in Time Period 1, an event 1802 occurs (e.g., such as an incident at a hospital), and the communication resources 104-1*a*, 104-2 attempt data-sharing, similar to as depicted in FIG. 13, for example to share hospital video as has been previously described. A dash-lined indicator 1804, that corresponds to the indicator 1304, is therebetween, indicating failure of such data-sharing. It is understood that actuation of the indicator 1804 may cause indicators similar to the indicators 1306, 1308, to be provided at the GUI 118, as well as actuatable options similar to the actuatable options 1310*a*, 1310*b*. Put another way, in this example, the dash-lined indicator 1804, as well as other similar indicators, may comprise actuatable options.

Also depicted in FIG. 18 is a dashed line indicator 1806, with a corner, between the communication resources 104-1*a*, 104-3, indicating that, in the simulated incident, simulated communication resource corresponding to the communication resource 104-1*a* attempted to share the hospital video in Time Period 2 with another simulated communication resource corresponding to the communication resource 104-3. The dashed line indicator 1806 indicates a failure of data-sharing of the hospital video between the communication resources 104-1*a*, 104-3, and when the dashed line indicator 1806 is actuated, such actuation may cause indicators similar to the indicators 1306, 1308, to be provided at the GUI 118, as well actuatable options similar to the actuatable options 1310*a*, 1310*b*, but customized for data-sharing parameters 130 associated with the communication resources 104-1*a*, 104-3.

Furthermore, the corner in the dashed line indicator 1806 may be actuated, which may cause a text box to be provided indicating reasons for the attempted data-sharing, for example as indicated by the fourth dataset 134.

As further depicted, in Time Period 2, another event 1808 occurs (e.g., such as an identification of a suspect), and the communication resources 104-1*b*, 104-3 attempt data-sharing, similar to as depicted in FIG. 14, for example to communicate information about the suspect between police agencies. A solid-lined indicator 1810, that corresponds to the indicator 1404, is therebetween, indicating success of such data-sharing. It is understood that actuation of the indicator 1810 may cause an indicator similar to the indicator 1406 to be provided at the GUI 118.

As further depicted, in Time Period 3, another event 1812 occurs (e.g., such as video of the suspect being captured), and the communication resources 104-1*c*, 104-3 attempt data-sharing, similar to as depicted in FIG. 16, for example to communicate a video of the suspect to a terminal. A dash-lined indicator 1814, that corresponds to the indicator 1604, is therebetween, indicates failure of such data-sharing. It is understood that actuation of the indicator 1814 may cause indicators similar to the 1606, 1608, to be provided at the GUI 118, as well actuatable options similar to the actuatable options 1610*a*, 1610*b*.

While not depicted, the GUI 118 may be provided with a slider, and the like, that when operated may "slide" the GUI 118 through time, for example to show or hide the various time periods and/or events and associated data sharing.

It is further understood that the data-sharing parameters 130 may further be dependent on event types, and the method 300 and/or the GUI 118 may be adapted accordingly. For example, for events in hospitals, sharing of hospital video may be permitted between certain agencies and/or agency types, whereas for events outside of hospitals, sharing of hospital video may not be permitted between certain agencies and/or agency types. Such data sharing dependent on event types may be stored at the data-sharing parameters 130.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, simulate incidents, generate GUIS and the like).

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

obtaining, via a computing device, a first dataset identifying one or more data-sharing parameters between an agency and one or more other agencies, the one or more data-sharing parameters indicating communication permissions for communicating given data between the agency and the one or more other agencies via one or more communication resources;

obtaining, via the computing device, a second dataset comprising information corresponding to a simulated incident involving a first agency and a second agency, the second dataset identifying data exchanged between the first agency and the second agency via one or more respective communication resources as part of a response to the simulated incident;

mapping, via the computing device, the data exchanged between the first agency and the second agency, identified by the second dataset, to the one or more data-sharing parameters identified by the first dataset;

based on the mapping of the data exchanged to the one or more data-sharing parameters, determining, via the computing device, that at least one of the one or more data-sharing parameters fails to permit data-sharing for at least a portion of the data exchanged in the simulated incident via the one or more communication resources between the agency and the one or more other agencies;

in response to determining the at least one of the one or more data-sharing parameters fails to permit data-sharing: automatically generating, via the computing device, a graphic user interface (GUI) identifying the portion of the data exchanged, the GUI including one or more actuatable inputs associated the at least one of the one or more data-sharing parameters that fails to permit data-sharing; and receiving, via the computing device, an actuation of an actuatable input, of the one or more actuatable inputs and, in response: modifying an associated data-sharing parameter to permit data-sharing between the agency and the one or more other agencies, via the one or more communication resources, for given data that corresponds to the portion of the data exchanged.

2. The method of claim 1, further comprising obtaining, via the computing device, a third dataset comprising information identifying available communication resources of the agency, wherein the third dataset further identifies the one or more respective communication resources of one or more of the first agency and the second agency used for the data exchanged in the simulated incident;

mapping, via the computing device, the respective communication resources of one or more of the first agency and the second agency to the available communication resources of the agency;

based on the mapping of the respective communication resources of one or more of the first agency and the second agency to the available communication resources of the agency, determining, via the computing device, that the agency lacks an available communication resource for data-sharing between the agency and the one or more other agencies for at least a further portion of the data exchanged in the simulated incident;

in response to determining the agency lacks an available communication resource for data-sharing of the further portion of the data exchanged, automatically updating, via the computing device, the GUI, to: identify the further portion of the data exchanged; and to include one or more further actuatable inputs associated with the further portion of the data exchanged; and receiving, via the computing device, a further actuation of a further actuatable input, of the one or more further actuatable inputs and, in response, implementing an electronic remedial action to provide a communication resource for one or more of the agency and the one or more other agencies to enable communications between the agency and the one or more other agencies, for further given data that corresponds to the further portion of the data exchanged.

3. The method of claim 2, wherein the electronic remedial action to provide the communication resource comprises one or more of:

replacing the available communication resource with the communication resource;

provisioning the communication resource to an officer of the agency;

enabling an alternate communication resource associated with the officer as the communication resource; and enabling a personal communication resource of the officer as the communication resource.

4. The method of claim 1, wherein modifying the associated data-sharing parameter to permit the data-sharing between the agency and the one or more other agencies comprises:

providing, at the GUI, at least two options for modifying the associated data-sharing parameter;

receiving, via an input device, a selection of one option, of the at least two options; and modifying the associated data-sharing parameter according to the selection of the one option of the at least two options.

5. The method of claim 1, wherein modifying the associated data-sharing parameter to permit data-sharing between the agency and the one or more other agencies comprises:

generating, using a large language model, a modification to the associated data-sharing parameter that permits the data-sharing between the agency and the one or more other agencies; and modifying the associated data-sharing parameter according to the modification.

6. The method of claim 1, further comprising:

simulating the simulated incident involving the first agency and the second agency, to obtain the second dataset.

7. The method of claim 1, wherein the GUI is timeline-based, indicating sequences of data exchanges between the agency and the one or more other agencies, based on the mapping.

8. The method of claim 1, wherein the GUI is map-based, showing locations of the agency, and the one or more other agencies, and data exchanges between the agency and the one or more other agencies.

9. A computing device comprising:

a controller; and a computer-readable storage medium having stored thereon program instructions that, when executed by the controller, causes the controller to perform a set of operations comprising:

obtaining a first dataset identifying one or more data-sharing parameters between an agency and one or more other agencies, the one or more data-sharing parameters indicating communication permissions for communicating given data between the agency and the one or more other agencies via one or more communication resources;

obtaining a second dataset comprising information corresponding to a simulated incident involving a first agency and a second agency, the second dataset identifying data exchanged between the first agency and the second agency via one or more respective communication resources as part of a response to the simulated incident;

mapping the data exchanged between the first agency and the second agency, identified by the second dataset, to the one or more data-sharing parameters identified by the first dataset;

based on the mapping of the data exchanged to the one or more data-sharing parameters, determining that at least one of the one or more data-sharing parameters fails to permit data-sharing for at least a portion of the data exchanged in the simulated incident via the one or more communication resources between the agency and the one or more other agencies;

in response to determining the at least one of the one or more data-sharing parameters fails to permit data-sharing: automatically generating a graphic user interface (GUI) identifying the portion of the data exchanged, the GUI including one or more actuatable inputs associated the at least one of the one or more data-sharing parameters that fails to permit data-sharing; and receiving an actuation of an actuatable input, of the one or more actuatable inputs and, in response: modifying an associated data-sharing parameter to permit data-sharing between the agency and the one or more other agencies, via the one or more communication resources, for given data that corresponds to the portion of the data exchanged.

10. The device of claim 9, wherein the set of operations further comprises:

obtaining a third dataset comprising information identifying available communication resources of the agency, wherein the third dataset further identifies the one or more respective communication resources of one or more of the first agency and the second agency used for the data exchanged in the simulated incident;

mapping the respective communication resources of one or more of the first agency and the second agency to the available communication resources of the agency;

based on the mapping of the respective communication resources of one or more of the first agency and the second agency to the available communication resources of the agency, determining that the agency lacks an available communication resource for data-sharing between the agency and the one or more other agencies for at least a further portion of the data exchanged in the simulated incident;

in response to determining the agency lacks an available communication resource for data-sharing of the further portion of the data exchanged, automatically updating the GUI, to: identify the further portion of the data exchanged; and to include one or more further actuatable inputs associated with the further portion of the data exchanged; and receiving a further actuation of a further actuatable input, of the one or more further actuatable inputs and, in response, implementing an electronic remedial action to provide a communication resource for one or more of the agency and the one or more other agencies to enable communications between the agency and the one or more other agencies, for further given data that corresponds to the further portion of the data exchanged.

11. The device of claim 10, wherein the electronic remedial action to provide the communication resource comprises one or more of:

replacing the available communication resource with the communication resource;

provisioning the communication resource to an officer of the agency;

enabling an alternate communication resource associated with the officer as the communication resource; and enabling a personal communication resource of the officer as the communication resource.

12. The device of claim 9, wherein modifying the associated data-sharing parameter to permit the data-sharing between the agency and the one or more other agencies comprises:

providing, at the GUI, at least two options for modifying the associated data-sharing parameter;

receiving, via an input device, a selection of one option, of the at least two options; and modifying the associated data-sharing parameter according to the selection of the one option of the at least two options.

13. The device of claim 9, wherein modifying the associated data-sharing parameter to permit data-sharing between the agency and the one or more other agencies comprises:

generating, using a large language model, a modification to the associated data-sharing parameter that permits the data-sharing between the agency and the one or more other agencies; and modifying the associated data-sharing parameter according to the modification.

14. The device of claim 9, further comprising:

simulating the simulated incident involving the first agency and the second agency, to obtain the second dataset.

15. The device of claim 9, wherein the GUI is timeline-based, indicating sequences of data exchanges between the agency and the one or more other agencies, based on the mapping.

16. The device of claim 9, wherein the GUI is map-based, showing locations of the agency, and the one or more other agencies, and data exchanges between the agency and the one or more other agencies.

* * * * *